(12) United States Patent
Takashima et al.

(10) Patent No.: US 8,098,998 B2
(45) Date of Patent: Jan. 17, 2012

(54) OPTICAL TRANSMITTER

(75) Inventors: Shigehiro Takashima, Tokorozawa (JP);
Takayoshi Fukui, Yokohama (JP);
Yoshikuni Uchida, Yokohama (JP);
Kazuyoshi Yamaki, Yokohama (JP);
Youichi Honzawa, Fujisawa (JP)

(73) Assignee: Opnext Japan, Inc., Kanagawa (JP)

( * ) Notice: Subject to any disclaimer, the term of this patent is extended or adjusted under 35 U.S.C. 154(b) by 920 days.

(21) Appl. No.: 12/108,089

(22) Filed: Apr. 23, 2008

(65) Prior Publication Data
US 2009/0060528 A1   Mar. 5, 2009

(30) Foreign Application Priority Data

Apr. 23, 2007   (JP) .................................. 2007-113436
Mar. 27, 2008   (JP) .................................. 2008-083719

(51) Int. Cl.
*H04B 10/04* (2006.01)
(52) U.S. Cl. .................... 398/186; 398/183; 398/187
(58) Field of Classification Search .......... 398/182–191, 398/197–198
See application file for complete search history.

(56) References Cited

U.S. PATENT DOCUMENTS

| 5,543,952 | A * | 8/1996 | Yonenaga et al. ............ 398/185 |
| 5,867,534 | A | 2/1999 | Price et al. | |
| 2004/0005154 | A1 | 1/2004 | MacDonald | |
| 2004/0228637 | A1 * | 11/2004 | Lee et al. ...................... 398/183 |
| 2005/0286908 | A1 * | 12/2005 | Way ............................... 398/186 |
| 2006/0110168 | A1 * | 5/2006 | Kim et al. ..................... 398/188 |
| 2006/0227401 | A1 * | 10/2006 | Webb et al. ................... 359/276 |

FOREIGN PATENT DOCUMENTS

| JP | 10-246874 | 9/1998 |
| JP | 33306573 | 5/2002 |
| JP | 3657983 | 3/2005 |
| JP | 3723358 | 9/2005 |

OTHER PUBLICATIONS

Kaiser et al "Reduced Complexity Optical Duobinary 10-Gb/s Transmitter Setup Resulting in an Increased Transmission Distance" IEEE Photonics Technology Letters vol. 13 No. 8 pp. 884-886 Aug. 2001.
European Search Report, with written opinion, issued in European patent application No. EP 08251488.6-2415 dated Aug. 12, 2008.

* cited by examiner

*Primary Examiner* — Dzung Tran
(74) *Attorney, Agent, or Firm* — McDermott Will & Emery LLP

(57) ABSTRACT

A technology to automatically control the biasing of an optical duobinary transmitter using a single-drive LN-MZ modulator is provided. A low-frequency signal is amplitude modulated onto a voltage signal input into a Mach-Zehnder optical modulator 22. The optical output from the optical modulator 22 is detected by an optical detection subsystem 30. In a bias control subsystem 40, the low-frequency signal component amplitude modulated onto the electrical signal is detected from the optical output, and a DC bias voltage applied to the optical modulator is controlled such that the low-frequency signal component is either minimized or maximized.

5 Claims, 11 Drawing Sheets

OPTICAL TRANSMITTER

The present application claims priority from Japanese applications 2007-113436 filed on Apr. 23, 2007 and 2008-83719 filed on Mar. 27, 2008, the content of which are hereby incorporated by reference into this application.

FIELD OF THE INVENTION

The present invention relates to transmitters used in optical transmission, and more particularly, to an optical transmitter that generates an optical signal using optical duobinary modulation.

BACKGROUND OF THE INVENTION

In optical transmission systems of the related art, binary intensity modulation (IM) is widely used. Also referred to as on-off keying, binary IM is a method wherein the logical "1" and "0" values of a signal to be transmitted are respectively associated with large and small optical intensities. This method has the merit of allowing for a simply-constructed transmitter and receiver, and for this reason is widely used at present.

Meanwhile, in recent years optical duobinary modulation is gathering attention as another method. Optical duobinary modulation is similar to binary IM, in that large and small optical intensities are associated with logical "1" and "0" values. However, in this method, two optical phases, 0° and 180°, are used for the high-intensity signal corresponding to the logical value "1", and the baseband bandwidth is decreased.

In optical duobinary modulation, the optical signal intensity waveform is the same as that of binary IM, and for this reason can be received using a conventional optical receiver. In addition, since the baseband bandwidth is decreased, the spectral width is reduced and dispersion resistance is increased. For this reason, it becomes possible to increase the transmission distance or increase the number of channels in a WDM system. Given the above, recent attention has been focusing on optical duobinary modulation, and the development of optical transmitters implementing optical duobinary modulation is actively moving forward.

An exemplary method for modulating an optical duobinary signal and an exemplary configuration of an optical transmitter that generates an optical duobinary signal are disclosed in Japan Patent No. 3657983 and Japan Patent No. 3306573. As disclosed in the above literature, a method is known wherein a lithium niobate (LN), Mach-Zehnder (MZ) optical modulator is driven at an amplitude equal to or slightly less than 2Vpi (i.e., double the half-wavelength voltage), a bias voltage being applied to the modulator at the point where the optical output power is at a minimum (i.e., the null point of the characteristic transmission curve).

Although it is necessary in optical duobinary modulation to apply a bias voltage at the point where the optical output power is at a minimum (i.e., the null point of the characteristic transmission curve), the null point of an LN-MZ modulator tends to drift. For this reason, means for automatically controlling the bias voltage are required when constructing the optical transmitter.

As disclosed in Japan Patent No. 3723358, one method of realizing the above is known wherein a low-frequency signal is superimposed on an input electrical signal input into an LN-MZ modulator. This low-frequency component is detected from the output light of the LN-MZ modulator, and the bias voltage is controlled on the basis of this detected value.

In the biasing method as part of a system for generating an optical duobinary signal disclosed in Japan Patent No. 3723358, a modulator referred to as a dual-drive LN-MZ modulator is used to achieve zero-chirp modulation by push-pull driving two input terminals respectively provided in association with the two paths of a split waveguide.

However, when constructing an optical duobinary transmitter that uses a dual-drive LN-MZ modulator, it is necessary to provide two independent modulator drive circuits. Moreover, if the two independent drive circuit timings are not accurately matched and amplitude balance is not maintained, then accurate driving of the modulator cannot be assured.

Meanwhile, in recent years a modulator referred to as a single-drive LN-MZ modulator has been developed and put into practice, wherein push-pull driving is achieved inside the modulator using a single input. W. Kaiser et al. have proposed an optical duobinary transmitter constructed using a single-drive LN-MZ modulator (W. Kaiser et al., "Reduced Complexity Optical Duobinary 10-Gb/s Transmitter Setup Resulting in an Increased Transmission Distance," IEEE Photonics Technology Letters, vol. 13, pp. 884-886, August 2001).

When using a single-drive LN-MZ modulator, construction of the transmitter is simplified, as only one modulator drive circuit need be provided. In addition, although LN-MZ modulators are constructed to be highly symmetric, it is not necessary to match drive circuit timings or amplitude balance in the construction of the transmitter, and thus the construction and adjustment thereof is simple.

However, with an optical duobinary transmitter using a single-drive LN-MZ modulator, it is not possible to independently apply voltages to the two respective paths of a split waveguide. For this reason, the bias voltage cannot be controlled using conventional methods, such as the method disclosed in Japan Patent No. 3723358, for example.

SUMMARY OF THE INVENTION

The present invention provides technology to automatically control the biasing of an optical duobinary transmitter using a single-drive LN-MZ modulator.

Consequently, one embodiment of the present invention is an optical transmitter including a single-drive LN-MZ modulator. The transmitter is provided with means for converting a data signal onto a three-level duobinary signal, means for generating a three-level, optical duobinary signal by modulating an optical signal using the three-level duobinary signal, means for amplitude modulating by a low-frequency signal onto the duobinary signal input into the means for generating an optical duobinary signal, means for outputting a monitor output signal that monitors the output from the means for generating an optical duobinary signal, and means for generating and controlling a bias voltage applied to the means for generating an optical duobinary signal. The means for generating and controlling a bias voltage generates two bias voltages (Vb+ΔVb) and (Vb−ΔVb) by adding a drift bias ±ΔVb to a set bias value Vb, and applies these two bias voltages in alternation to the means for generating an optical duobinary signal. These two bias voltages are generated by first solving for the differences V−mon and V+mon between the monitor output signal value when the low-frequency signal is high and the monitor output signal value when the low-frequency signal is low. Upon solving for the difference between V−mon and V+mon, a new set bias value Vb is configured, and two bias voltages (Vb+ΔVb) and (Vb−ΔVb) are generated based on this difference between V−mon and V+mon.

According to an embodiment of the present invention, automatic bias control of an optical duobinary transmitter using a single-drive LN-MZ modulator is achieved. In so doing, null point drift in the LN-MZ modulator is compensated for, and an optical duobinary transmitter is realized that operates stably over long periods of time.

DETAILED DESCRIPTION OF THE EMBODIMENTS

Hereinafter, embodiments of the invention will be described with reference to the accompanying drawings.

First Embodiment

Figure 1:
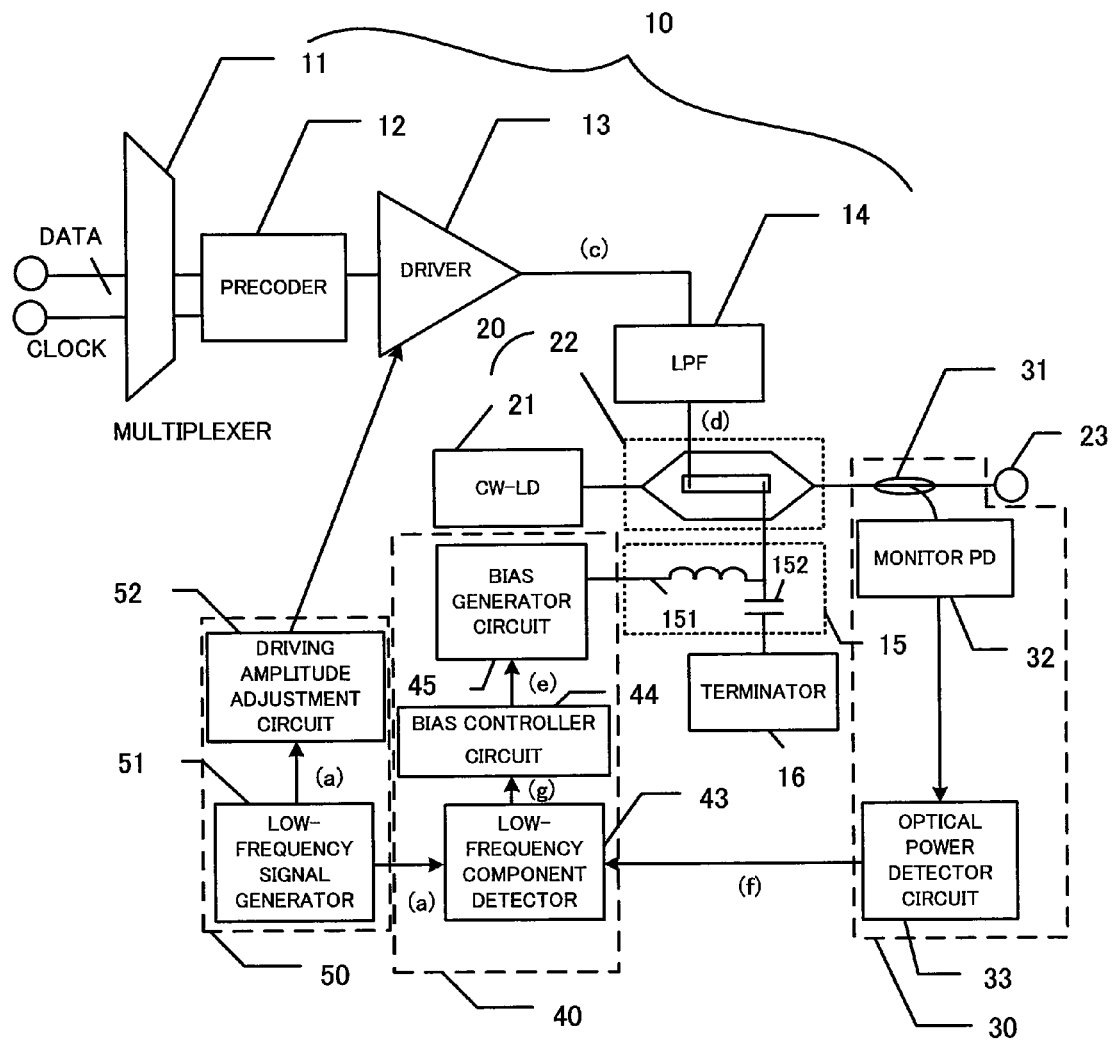
FIG. 1 is a block diagram of an optical duobinary transmitter in accordance with an embodiment of the present invention.
Figure 2:
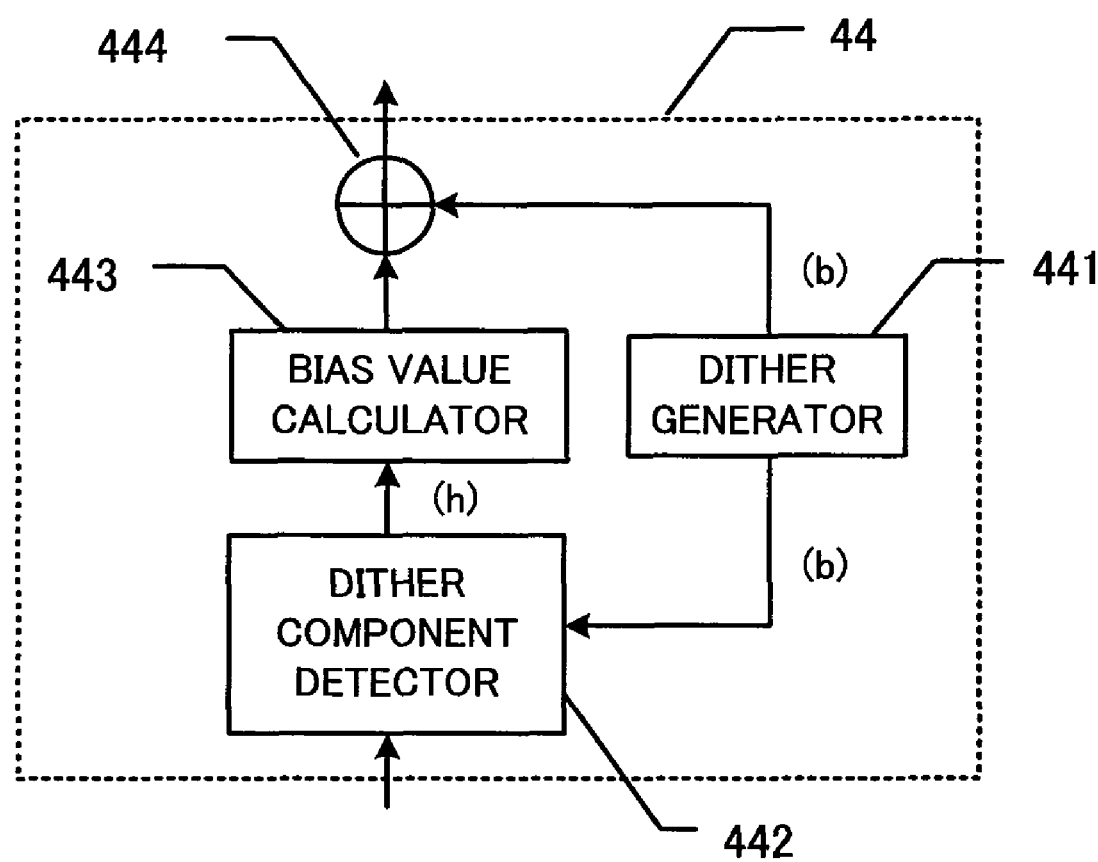
FIG. 2 is a block diagram showing the configuration of the bias control circuit in FIG. 1.
Figure 8:
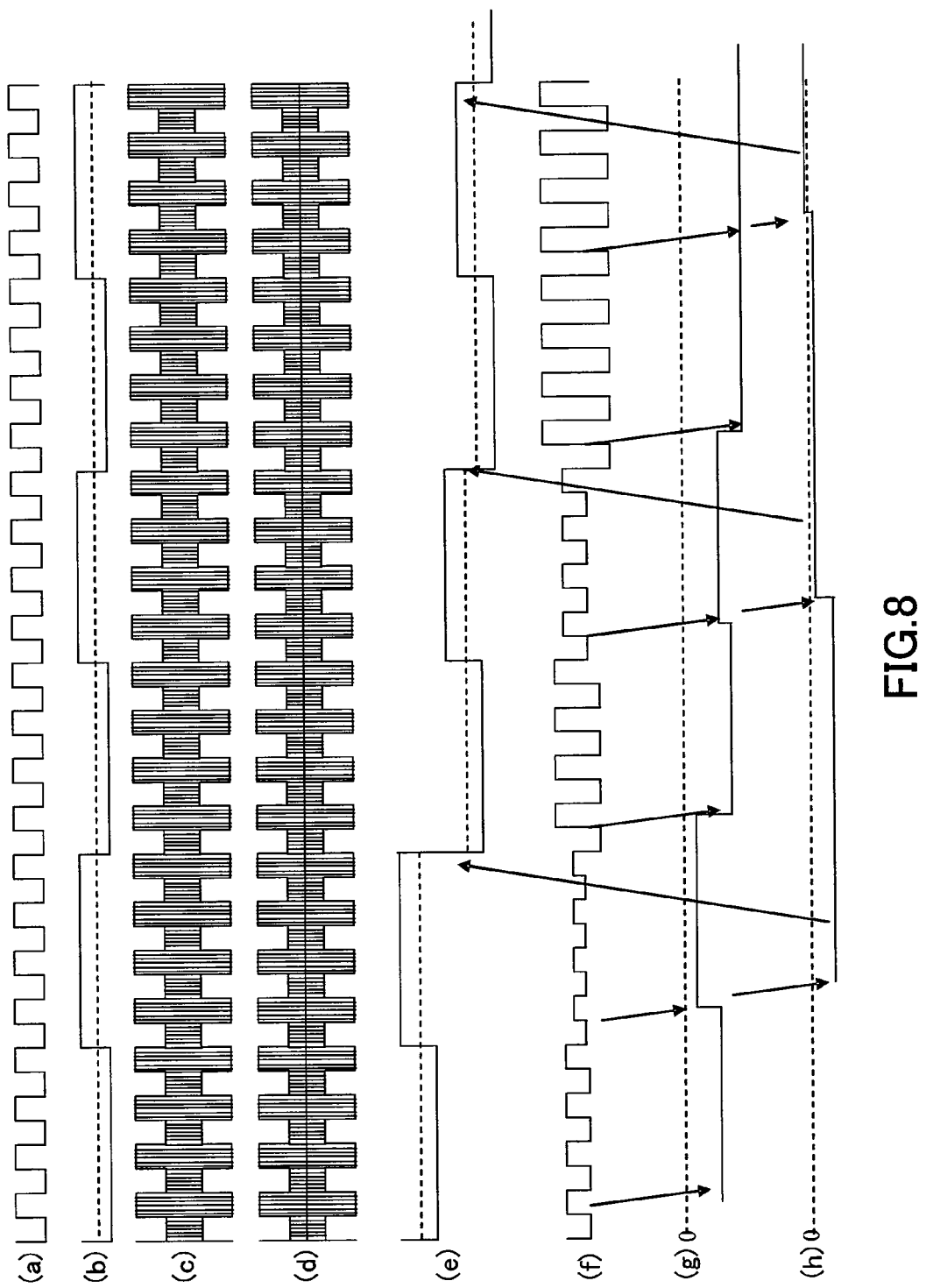
FIG. 8 is a diagram illustrating the waveforms of the signals output by the respective components of the device shown in FIG. 1, in accordance with a first embodiment of the invention.

A first embodiment of the present invention will now be described. FIG. 1 shows the configuration of an optical duobinary transmitter in accordance with the first embodiment. FIG. 2 shows the detailed configuration of the bias control circuit shown in FIG. 1. In addition, FIG. 8 illustrates the signal waveforms and timings for each component of the optical duobinary transmitter in accordance with the first embodiment. Reference symbols (a) through (h) in FIGS. 1 and 2 correspond to the reference symbols indicating the signals shown in FIG. 8.

The optical duobinary transmitter shown in FIG. 1 is provided with the following. A modulated signal generator subsystem 10 functions as means for converting a data signal to a three-level duobinary signal (d). An optical signal modulator subsystem 20 functions as means for generating a three-level optical duobinary signal by modulating an optical signal using the three-level duobinary signal converted by the modulated signal generator subsystem 10. An optical detector subsystem 30 functions as means for detecting a low-frequency amplitude value (g) by monitoring the output from the optical signal modulator subsystem 20. A bias controller subsystem 40 functions as means for controlling a bias voltage $V_B$ that is applied to the optical signal modulator subsystem 20. A low-frequency amplitude modulator subsystem 50 functions as means for modulating the three-level duobinary signal (d) that was converted by the modulated signal generator subsystem 10 by using a low-frequency signal (a).

The low-frequency amplitude modulator subsystem 50 includes a low-frequency signal generator 51 and a driving amplitude adjustment circuit 52. The low-frequency signal generator 51 generates a low-frequency signal (a). The low-frequency signal generator 51 then outputs the generated low-frequency signal (a) to the driving amplitude adjustment circuit 52.

As shown in FIG. 8(a), the low-frequency signal (a) generated in the first embodiment is a signal having high values and low values.

The driving amplitude adjustment circuit 52 receives the low-frequency signal (a), generates a pilot tone, and then supplies this pilot tone to the gain control terminal of a driver 13, to be hereinafter described. Using this pilot tone, the low-frequency signal (a) is amplitude modulated onto the output signal (c) from the driver 13.

In addition, the low-frequency signal generator 51 also supplies the low-frequency signal (a) to the bias controller subsystem 40.

The optical signal modulator subsystem 20 includes a CW laser diode 21 that emits CW laser light, as well as a single-drive LN-MZ modulator 22 that modulates the light from the CW laser diode 21. In the LN-MZ modulator 22, light from the CW laser diode 21 is modulated, an optical duobinary signal is generated, and this signal is then output from an optical output terminal 23.

The modulated signal generator subsystem 10 includes a multiplexer 11, a precoder 12, a driver 13, a low-pass filter 14, a bias tee 15, and a terminator 16.

In the multiplexer 11, a data signal and a clock signal from outside the transmitter are input, and a serial data signal is generated. The serial data signal generated in the multiplexer 11 and the clock signal are then input into the precoder 12, where the signals are differentially encoded. The internal configuration of the precoder 12 may be as disclosed by W. Kaiser et al., for example. The output of the precoder 12 is connected to the driver 13.

The driver 13 is provided with a gain adjustment terminal, and the low-frequency signal (a) modulated onto amplitude of the output signal (c) from the driver 13 by using the pilot tone input from the driving amplitude adjustment circuit 52. This modulation of the output signal (c) from the driver 13 by the low-frequency signal (a) is conducted in order to detect the optimal set value for the bias voltage $V_B$.

The output signal (c) from the driver 13 is filtered and then converted into a three-level duobinary signal (d) at the low-pass filter 14. The three-level duobinary signal (d) converted at the low-pass filter 14 is then input into the LN-MZ modulator 22 (i.e., the optical modulator).

Upon receiving as input the three-level duobinary signal (d), the LN-MZ modulator 22 modulates the light from the CW laser diode 21, and generates a three-level optical duobinary signal. The principles of optical duobinary signal generation are already known, as described in detail in Japan Patent No. 3306573, for example. However, it should be appreciated that, in the present invention, the dual-drive LN-MZ modulator used in the above literature is not used, and instead a single-drive LN-MZ modulator is used.

The three-level duobinary signal (d) input into the LN-MZ modulator 22 passes through the bias tee 15 and is terminated at the terminator 16. The bias tee 15 includes an inductance element 151 and a capacitor 152. In the example shown in FIG. 1, the capacitor 152 is positioned between the LN-MZ modulator 22 and the terminator 16, while one end of the inductance element 151 is connected to a connection wire running between the capacitor 152 and the LN-MZ modulator 22. The other end of the inductance element 151 is connected to the output of a bias generator circuit 45. In order to apply a bias voltage $V_B$ generated by the bias generator circuit 45 to the LN-MZ modulator 22, the bias tee 15 couples the bias generator circuit 45 and the LN-MZ modulator 22.

In the example shown in FIG. 1 as described above, the bias tee 15 is used for terminating the three-level duobinary signal (d) and applying the bias voltage $V_B$. However, other methods may also be implemented, so long as they provide means to terminate the three-level duobinary signal (d) while maintaining the application of a bias voltage $V_B$ to the LN-MZ modulator 22. As an example, a method may be used wherein independent electrodes are provided for applying a bias voltage $V_B$ to the LN-MZ modulator 22.

In addition, in the example shown in FIG. 1 as described above, the bias tee 15 is disposed between the LN-MZ modulator 22 and the terminator 16, but the invention is not limited thereto. For example, a configuration wherein the bias tee 15 is disposed between the low-pass filter 14 and the LN-MZ modulator 22 is also possible.

As shown in FIG. 1, the optical detector subsystem 30 includes an optical coupler 31, a monitor PD 32, and an optical power detector circuit 33. The optical coupler 31 is disposed between the LN-MZ modulator 22 and the optical output terminal 23. The optical coupler 31 partially splits the optical duobinary signal and sends the signal to the monitor PD 32. The monitor PD 32 is a light-detecting element having for example light-sensitive spectral characteristics and response characteristics capable of detecting the optical duobinary signal, and may be constructed from a photodiode, for example. The monitor PD 32 receives the optical duobinary signal that was split from the optical coupler 31, detects the light intensity (i.e., the optical output power) of the optical duobinary signal, and then converts the detected optical output power into a corresponding electrical signal. In addition, the monitor PD 32 is connected to the optical power detector circuit 33, and inputs the converted electrical signal corresponding to the optical output power into the optical power detector circuit 33.

Alternatively, there are commercially available LN-MZ modulator modules that include a built-in monitor PD that detects optical output power. Such LN-MZ modulator modules with built-in monitor PDs may be used in lieu of the LN-MZ modulator 22, the optical coupler 31, and the monitor PD 32.

In such cases, instead of detecting the optical output power of an optical duobinary signal output from the LN-MZ modulator 22, the monitor PD 32 is often configured to detect light that leaks from the LN-MZ modulator 22. In this case, the characteristic transmission curve of the monitor PD is the reverse of the characteristic transmission curve of the optical output of the LN-MZ modulator. For this reason, it is necessary to invert the polarity of detecting the optical output power.

The optical power detector circuit 33 takes the converted electrical signal corresponding to the optical output power that was detected by the monitor PD 32, converts this electrical signal from analog to digital, and then outputs the result as a monitor output signal (f). A transimpedance amp, for example, may be used as the optical power detector circuit 33.

The bias controller subsystem 40 includes a low-frequency component detector 43, a bias controller circuit 44, and a bias generator circuit 45.

The low-frequency component detector 43 reads the values of the monitor output signal (f) output from the optical power detector 33, and detects the amplitude values of the low-frequency signal (a) in the monitor output signal (f).

Specifically, in the first embodiment, the low-frequency component detector 43 calculates the difference (VH−VL) between the value VH of the monitor output signal (f) when the low-frequency signal (a) is high, and the signal value VL of the monitor output signal (f) when the low-frequency signal (a) is low. Subsequently, the low-frequency component detector 43 outputs the detected amplitude values (VH−VL) of the low-frequency signal (a) as a low-frequency amplitude signal (g). This low-frequency amplitude signal (g) is then input into a dither component detector 442 provided in the bias controller circuit 44, to be hereinafter described.

FIG. 2 shows the internal configuration of the bias controller circuit 44, which will now be described with reference to FIG. 2. The bias controller circuit 44 includes a dither generator 441, a dither component detector 442, a bias value calculator 443, and an adder 444.

The dither generator 441 generates a dither signal (b), and then outputs the generated dither signal (b) to the dither component detector 442 and the adder 444. Herein, the dither signal (b) refers to a signal having dither bias voltage values of $\pm \Delta Vb$ when the set bias value is Vb.

When the dither signal (b) is low, the bias voltage $V_B$ applied to the LN-MZ modulator 22 becomes $V_B = Vb - \Delta Vb$. In addition, when the dither signal (b) is high, the bias voltage $V_B$ applied to the LN-MZ modulator 22 becomes $V_B = Vb + \Delta Vb$.

Upon receiving as input the low-frequency amplitude signal (g) from the low-frequency component detector 43, the dither component detector 442 refers to the dither signal (b) input from the dither generator 441, and thereby detects the amplitude values of the dither signal (b) in the low-frequency amplitude signal (g).

Specifically, the dither component detector 442 calculates the difference (V−mon−V+mon) between the value V−mon of the low-frequency amplitude signal (g) when the dither signal (b) is low (i.e., when the bias voltage $V_B$ is $V_B = Vb - \Delta Vb$), and the value V+mon of the low-frequency amplitude signal (g) when the dither signal (b) is high (i.e., when the bias voltage $V_B$ is $V_B = Vb + \Delta Vb$). The detected amplitude values of the dither signal (b) are then output as a dither amplitude signal (h), this signal being input into the bias value calculator 443.

The bias value calculator 443 calculates a correction value for the set bias value Vb on the basis of the dither amplitude signal (h) output from the dither component detector 442. The bias value calculator 443 then outputs a new set bias value Vb to the adder 444.

Upon receiving both the new set bias value Vb that was calculated by the bias value calculator 443, as well as the dither signal (b) generated by the dither generator 441, the adder 444 outputs a signal (e) that takes the combined voltage (Vb±ΔVb) of the new set bias voltage value Vb and the dither bias voltage value ±ΔVb to be the bias voltage $V_B$, and then outputs this signal (e) to the bias generator circuit 45.

Upon receiving as input from the adder 444 within the bias controller circuit 44 the signal (e) that takes the bias voltage $V_B$ to be (Vb±ΔVb), the bias generator circuit 45 generates a bias voltage $V_B$=(Vb±ΔVb), and then applies this voltage $V_B$ to the LN-MZ modulator 22 via the bias tee 15.

Timing Chart

The operation of the device shown in FIG. 1 in accordance with a first embodiment of the invention as described above will now be described in further detail, with reference to the timing chart shown in FIG. 8.

The low-frequency signal (a) output from the low-frequency signal generator 51 is shown in FIG. 8(a). As shown in FIG. 8(a), the low-frequency signal (a) in the first embodiment is a signal having high and low values.

It should be appreciated that, so long as the low-frequency signal (a) is a signal having high and low values, the signal may be a sine wave or a rectangular wave.

The low-frequency signal generator 51 outputs the low-frequency signal (a) to the driving amplitude adjustment circuit 52. Subsequently, the driving amplitude adjustment circuit 52 receives the low-frequency signal (a), generates a pilot tone, and supplies this tone to the gain control terminal of the driver 13. In so doing, the low-frequency signal (a) is amplitude modulated onto the output signal (c) of the driver 13.

The output signal (c) of the driver 13 is shown in FIG. 8(c). The output signal (c) of the driver 13 is input into the low-pass filter 14. In the low-pass filter (LPF) 14, the output signal (c) of the driver 13 is converted into the three-level duobinary signal (d). The three-level duobinary signal (d) converted in the low-pass filter (LPF) 14 is then input into the LN-MZ modulator 22. The three-level duobinary signal (d) converted in the low-pass filter (LPF) 14 is shown in FIG. 8(d).

If the amplitude (driving amplitude) of the three-level duobinary signal (d) in the first embodiment is taken to be VRF, then the driving amplitude VRF is modulated to become VRF=VRF+ΔVRF when the low-frequency signal (a) is high, and the driving amplitude VRF is modulated to become VRF=VRF−ΔVRF when the low-frequency signal (a) is low.

Meanwhile, the dither generator 441 within the bias controller circuit 44 generates a dither signal (b), and outputs the generated dither signal (b) to the dither component detector 442 and the adder 444. The dither signal (b) generated by the dither generator 441 is shown in FIG. 8(b).

The dotted line in FIG. 8(b) indicates the value of the set bias value Vb, while the solid line indicates the dither signal (b) output by the dither generator 441. The dither bias voltage values are ±ΔVb with respect to the set bias value Vb.

Upon receiving as input both the new set bias value Vb calculated by the bias value calculator 443 as well as the dither signal (b) generated by the dither generator 441, the adder 444 output a signal (e) that takes the combined voltage (Vb±ΔVb) of the new set bias value Vb and the dither bias voltage value ±ΔVb to be the bias voltage $V_B$, and then outputs this signal (e) to the bias generator circuit 45. The signal (e) that takes (Vb±ΔVb) to be the bias voltage $V_B$, being output from the adder 444, is shown in FIG. 8(e). The broken line in FIG. 8(e) indicates the set bias value Vb, while the solid line indicates the signal waveform of the bias voltage $V_B$(=Vb±ΔVb) upon which the dither bias voltage values ±ΔVb of the dither signal (b) have been superimposed.

Upon receiving as input the signal (e) that takes (Vb±ΔVb) to be the bias voltage $V_B$ from the adder 444, the bias generator circuit 45 generates a bias voltage $V_B$=(Vb±ΔVb), and then applies this voltage $V_B$ to the LN-MZ modulator 22 via the bias tee 15.

Subsequently, the bias voltage $V_B$=(Vb±ΔVb) is applied to the LN-MZ modulator 22. In addition, upon receiving as input the three-level duobinary signal (d) (FIG. 8(d)), the LN-MZ modulator 22 modulates the light from the CW laser diode 21, and generates an optical duobinary signal.

The optical duobinary signal generated by the LN-MZ modulator 22 is then input into the monitor PD 32 via the optical coupler 31. The monitor PD 32 detects the optical output power of the optical duobinary signal, converts the detected optical output power into a corresponding electrical signal, and then outputs this electrical signal to the optical power detector 33.

The optical power detector 33 converts the electrical signal input from the monitor PD 32 from analog to digital, and then outputs the digital signal as the monitor output signal (f). The monitor output signal (f) output by the optical power detector 33 is shown in FIG. 8(f).

The pulse height corresponding to the low-frequency signal (a) in the monitor output signal (f) shown in FIG. 8(f) is changed by the period of the dither signal (b). This change occurs because the bias voltage $V_B$(=Vb±ΔVb), upon which the dither bias voltage value ±ΔVb of the dither signal (b) has been superimposed, is applied to the LN-MZ modulator 22, and thus the optical duobinary signal generated by the LN-MZ modulator 22 is changed.

Next, the low-frequency component detector 43 detects the amplitude values of the next low-frequency signal (a) in the monitor output signal (f) output by the optical power detector 33 (FIG. 8(f)). The low-frequency component detector 43 then outputs the amplitude values of the detected low-frequency signal (a) as a low-frequency amplitude signal (g), and outputs this low-frequency amplitude signal (g) to the dither component detector 442 within the bias controller circuit 44.

First, the low-frequency component detector 43 solves for the amplitude value V−mon of the low-frequency signal (a) that is present when a bias voltage $V_B$(=Vb−ΔVb) is applied to the LN-MZ modulator 22 by the bias generator circuit 45.

More specifically, the low-frequency component detector 43 calculates the difference (VH−VL) between the value VH of the monitor output signal (f) when the low-frequency signal (a) is high, and the value VL of the monitor output signal (f) when the low-frequency signal (a) is low, the above being calculated in the case where a bias voltage $V_B$(=Vb−ΔVb) is applied to the LN-MZ modulator 22.

In addition, the low-frequency component detector 43 also solves for the amplitude value V+mon of the low-frequency signal (a) that is present when a bias voltage $V_B$(=Vb+ΔVb) is applied to the LN-MZ modulator 22 by the bias generator circuit 45.

More specifically, the low-frequency component detector 43 calculates the difference (VH−VL) between the value VH of the monitor output signal (f) when the low-frequency signal (a) is high, and the value VL of the monitor output signal (f) when the low-frequency signal (a) is low, the above being calculated in the case where a bias voltage $V_B$(=Vb+ΔVb) is applied to the LN-MZ modulator 22. The low-frequency amplitude signal (g) output by the low-frequency component detector 43 is shown in FIG. 8(g).

The dither component detector 442 then refers to the dither signal (b) input from the dither generator 441, and solves for the amplitude values of the dither signal (b) in the low-frequency amplitude signal (g).

More specifically, the dither component detector 442 calculates the difference {(V−mon)−(V+mon)} between the value V−mon of the low-frequency amplitude signal (g) when a bias voltage $V_B(=Vb-\Delta Vb)$ is applied to the LN-MZ modulator 22 by the bias generator circuit 45, and the value V+mon of the low-frequency amplitude signal (g) when a bias voltage $V_B(=Vb+\Delta Vb)$ is applied to the LN-MZ modulator 22 by the bias generator circuit 45.

Subsequently, the dither component detector 442 outputs the calculated amplitude values of the dither signal (b) as a dither signal amplitude (h), and outputs this signal to the bias value calculator 443 within the bias controller circuit 44. The dither signal amplitude (h) output by the dither component detector 442 is shown in FIG. 8(h).

Upon receiving as input the dither signal amplitute (h) from the dither component detector 442, the bias value calculator 443 multiplies the amplitude values {(V−mon)−(V+mon)} of the dither signal (b) by a control loop gain G, and takes this quantity as a correction value for the set bias value Vb. The bias value calculator 443 then takes the corrected set bias value Vb′(=[Vb−G{(V−mon)−(V+mon)}]) as the new set bias value Vb, and outputs this new set bias value Vb to the adder 444 within the bias controller circuit 44.

Operational Principles

The optical transmitter using optical duobinary modulation operating as described above in accordance with an embodiment of the present invention will now be described in further detail, including description of the operational principles thereof.

The following description will take the value of the bias voltage $V_B$ applied to the LN-MZ modulator 22 from the bias generator circuit 45 via the bias tee 15 to be $V_0$, while the amplitude (driving amplitude) of the three-level duobinary signal (d) that is output from the driver 13 and filtered by the low-pass filter 14 will be taken to be VRF. Given the above, an input voltage V having the three voltage values of $V_0$−(VRF/2), $V_0$, and $V_0$+(VRF/2) is input into the LN-MZ modulator 22. As a result of receiving as input the three-level input voltage V ($V_0$−VRF/2, $V_0$, $V_0$+VRF/2), the LN-MZ modulator 22 generates a three-level optical duobinary signal.

Figure 3:
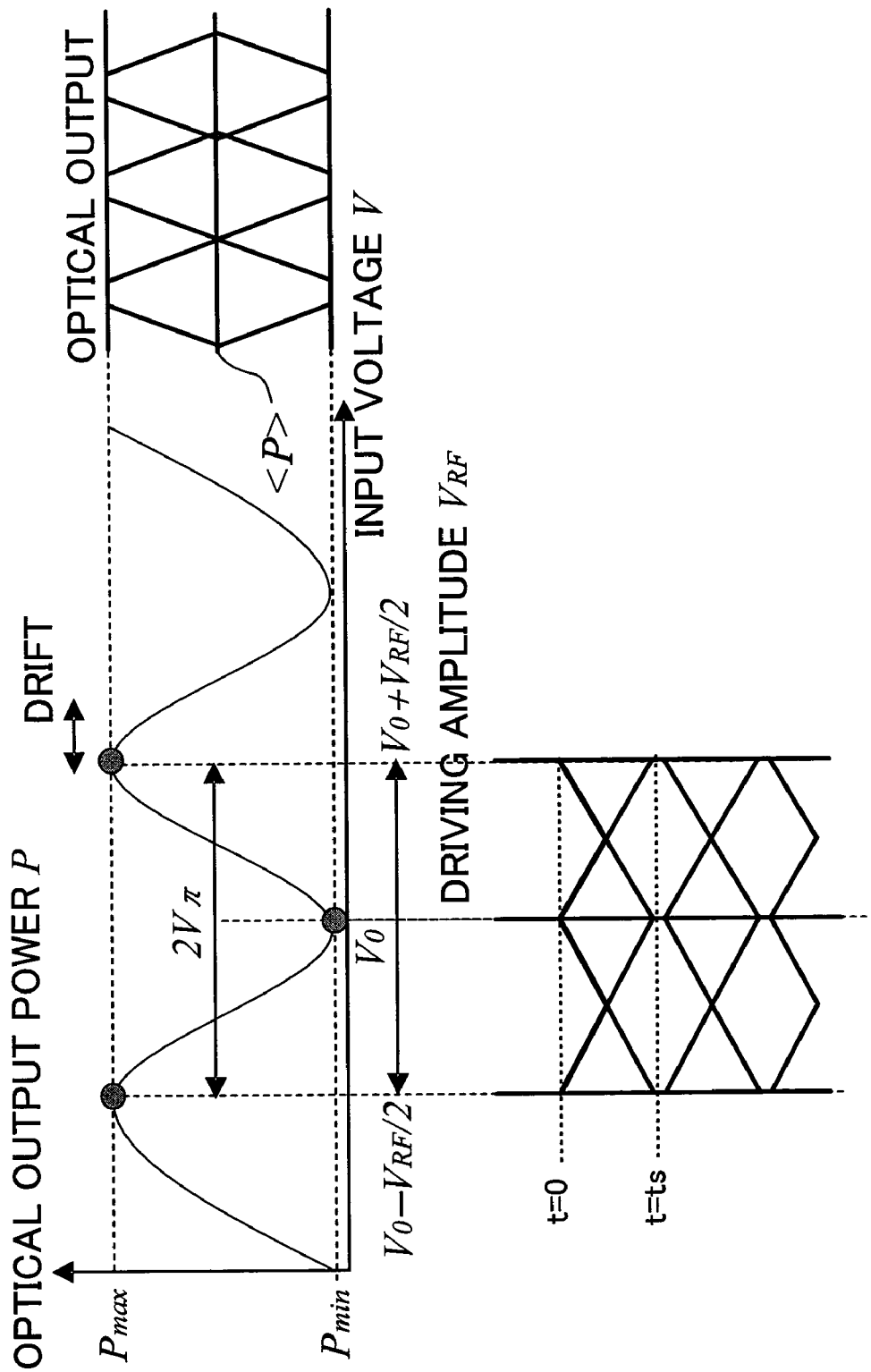
FIG. 3 is an explanatory diagram illustrating the relationship between the bias voltage $V_B$ of an optical duobinary LN-MZ modulator and the optical output power P.

The relationship between the three-level input voltage V input into the LN-MZ modulator 22 and the optical output power P of the LN-MZ modulator 22 is as shown in FIG. 3. Moreover, the optical output power P becomes a periodic function of the input voltage V.

In optical duobinary modulation, the intermediate voltage value $V_0$ of the three-level input voltage V input into the LN-MZ modulator 22 is configured to match the voltage value where the optical output power P of the LN-MZ modulator 22 is at a minimum (i.e., the null point of the characteristic transmission curve). In other words, the bias voltage $V_B$ is configured to match the voltage value where the optical output power P of the LN-MZ modulator 22 is at a minimum (i.e., the null point of the characteristic transmission curve).

However, since there exists null point drift in the LN-MZ modulator 22, mismatches occur between the intermediate voltage $V_0$ of the three-level input voltage V applied to the LN-MZ modulator 22 (i.e., the bias voltage $V_B$) and the voltage value where the optical output power P of the LN-MZ modulator 22 is at a minimum (i.e., the null point of the characteristic transmission curve). This causes the average value <P> of the optical output power P of the LN-MZ modulator 22 to change.

Consequently, when adopting optical duobinary modulation, it is necessary to detect the magnitude and direction of the drift in the voltage value where the optical output power P of the LN-MZ modulator 22 is at a minimum (i.e., the null point of the characteristic transmission curve), and then perform a control such that the intermediate voltage $V_0$ of the input voltage V input into the LN-MZ modulator 22 (i.e., the bias voltage $V_B$) and the voltage value where the optical output power P of the LN-MZ modulator 22 is at a minimum (i.e., the null point of the characteristic transmission curve) match.

Change in the Average Value <P> of the Optical Output Power P Due to Fluctuations in the Driving Amplitude VRF The change in the average value <P> of the optical output power P due to fluctuations in the driving amplitude VRF will now be described with reference to FIGS. 4, 5, and 6.

Figure 4:
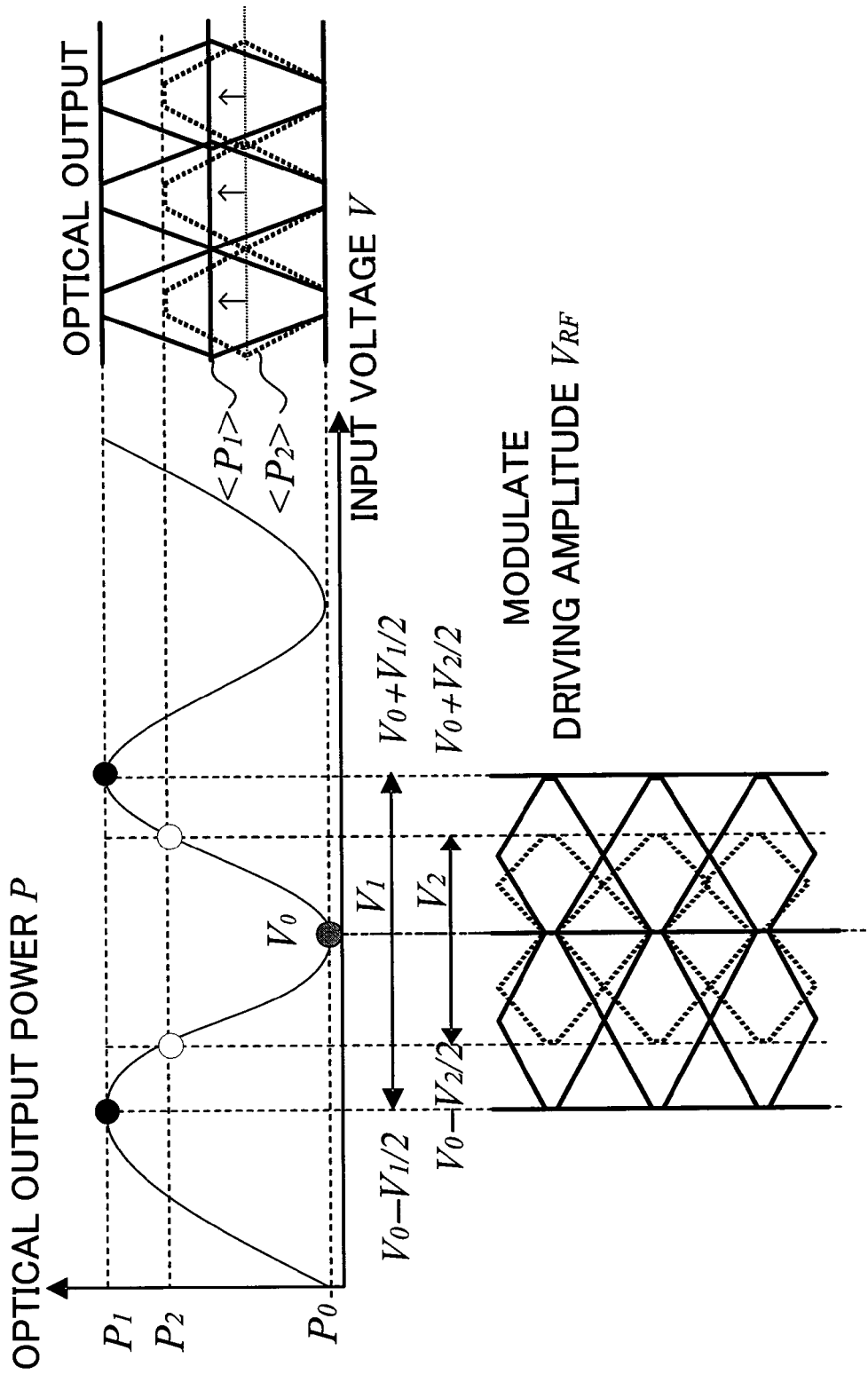
FIG. 4 is an explanatory diagram illustrating the change in the average value <P> of the optical output power P in the case where the driving amplitude is modified in an optical duobinary LN-MZ modulator, wherein the bias voltage $V_B$ matches the voltage value at which the optical output power P is at a minimum (i.e., the null point of the characteristic transmission curve)

FIG. 4 shows the change in the average value <P> of the optical output power P due to changes in the driving amplitude VRF, wherein the intermediate voltage $V_0$ (i.e., the bias voltage $V_B$) of the input voltage V matches the voltage value where the optical output power P is at a minimum (i.e., the null point of the characteristic transmission curve).

Figure 5:
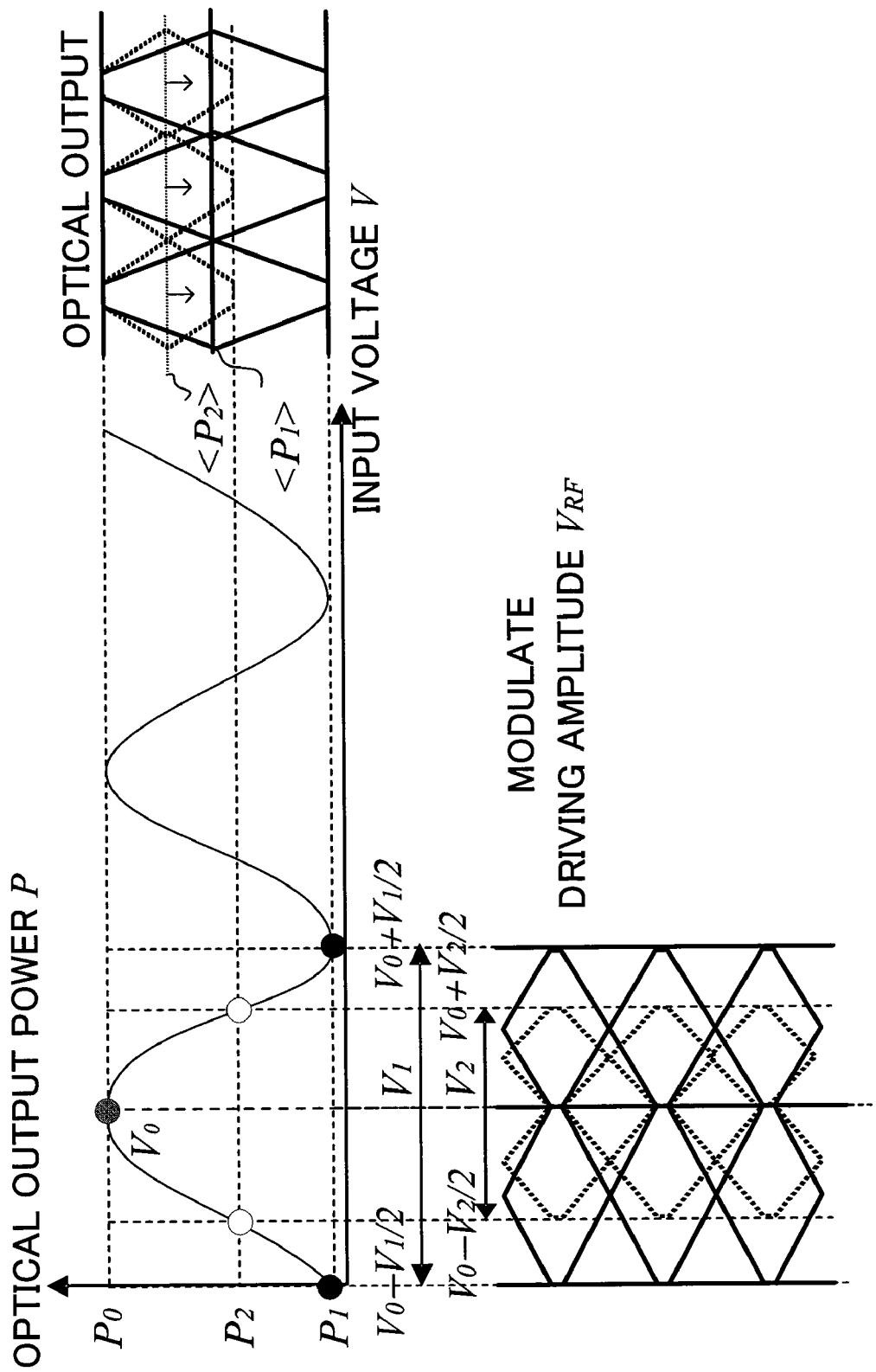
FIG. 5 is an explanatory diagram illustrating the change in the average value <P> of the optical output power P in the case where the driving amplitude is modified in an optical duobinary LN-MZ modulator, wherein the bias voltage $V_B$ matches the voltage value at which the optical output power P is at a maximum (i.e., the peak of the characteristic transmission curve)

FIG. 5 shows the change in the average value <P> of the optical output power P due to changes in the driving amplitude VRF, wherein the intermediate voltage $V_0$ (i.e., the bias voltage $V_B$) of the input voltage V matches the voltage value where the optical output power P is at a maximum (i.e., the peak of the characteristic transmission curve).

Figure 6:
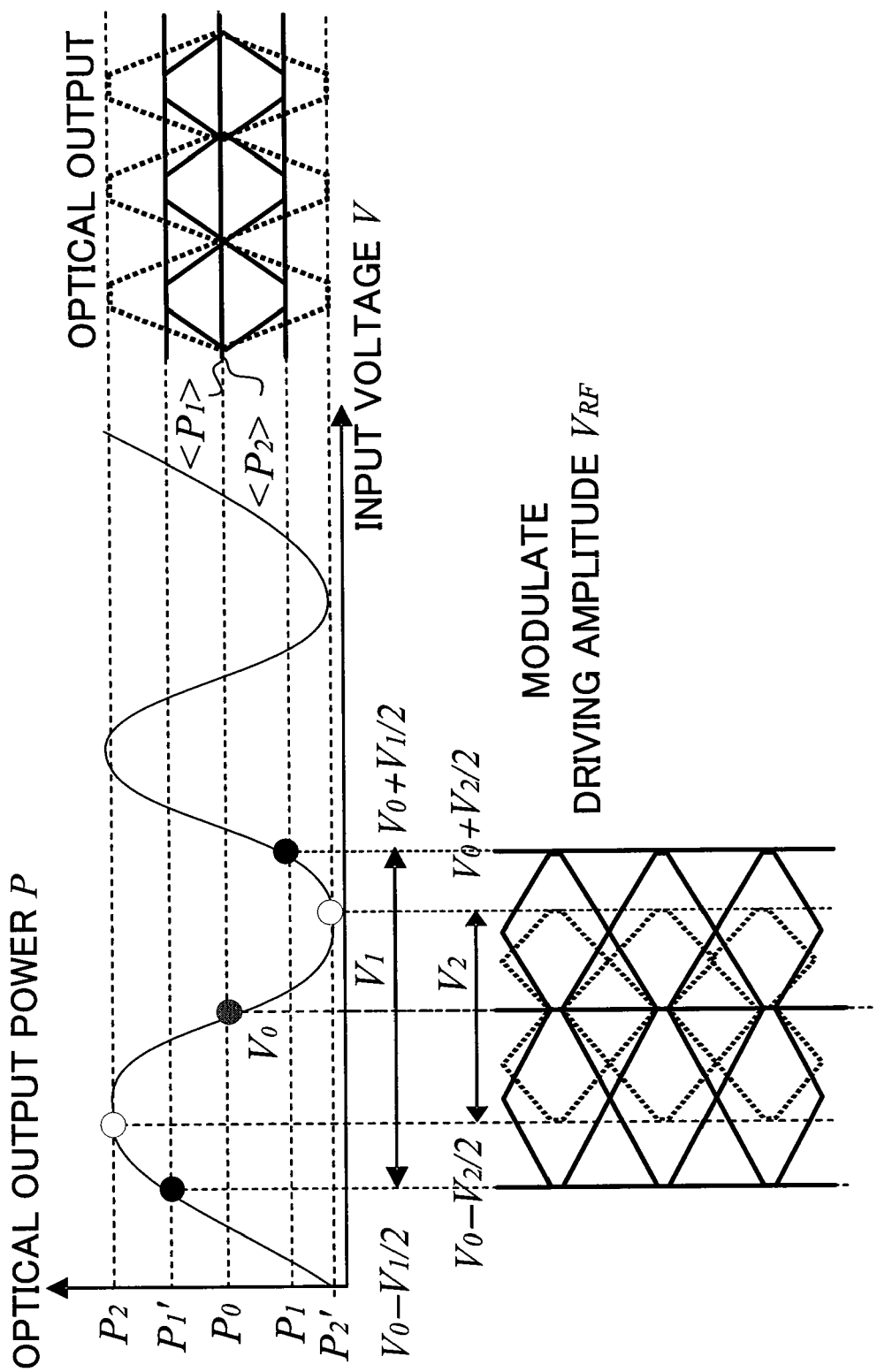
FIG. 6 is an explanatory diagram illustrating the change in the average value <P> of the optical output power P in the case where the driving amplitude is modified in an optical duobinary LN-MZ modulator, wherein the bias voltage $V_B$ is shifted one-fourth of a period away from the voltage value at which the optical output power P is at a minimum (i.e., the null point of the characteristic transmission curve)

FIG. 6 shows the change in the average value <P> of the optical output power P due to changes in the driving amplitude VRF, wherein the intermediate voltage $V_0$ (i.e., the bias voltage $V_B$) of the input voltage V matches a voltage value shifted one-fourth of a period away from the voltage value where the optical output power P is at a minimum (i.e., the null point of the characteristic transmission curve).

In FIG. 4, <P1> and <P2> represent the average value <P> of the optical output power P in the case where the driving amplitude VRF of the input voltage V input into the LN-MZ modulator 22 is V1 and V2, respectively (herein, V1>V2).

When the driving amplitude VRF is changed from V2 to V1 (i.e., when the driving amplitude VRF is increased), the average value <P> of the optical output power P changes from <P2> to <P1>, and thus the average value <P> of the optical output power P increases.

In FIG. 5, <P1> and <P2> represent the average value <P> of the optical output power P in the case where the driving amplitude VRF of the input voltage V input into the LN-MZ modulator 22 is V1 and V2, respectively (herein, V1>V2).

When the driving amplitude VRF is changed from V2 to V1 (i.e., when the driving amplitude VRF is increased), the average value <P> of the optical output power P changes from <P2> to <P1>, and thus the average value <P> of the optical output power P decreases.

In FIG. 6, <P1> and <P2> represent the average value <P> of the optical output power P in the case where the driving amplitude VRF of the input voltage V input into the LN-MZ modulator 22 is V1 and V2, respectively (herein, V1>V2).

As is apparent from FIG. 6, when the intermediate voltage $V_0$ (i.e., the bias voltage $V_B$) of the input voltage V matches a voltage value shifted one-fourth of a period away from the voltage value where the optical output power P is at a minimum (i.e., the null point of the characteristic transmission curve), <P1> and <P2> become the same value. Thus, when the driving amplitude VRF is changed from V2 to V1 (i.e., when the driving amplitude VRF is increased), the average value <P> of the optical output power P does not change.

This occurs because, when the intermediate voltage $V_0$ (i.e., the bias voltage $V_B$) of the input voltage V matches a voltage value shifted one-fourth of a period away from the voltage value where the optical output power P is at a minimum (i.e., the null point of the characteristic transmission curve), the intermediate voltage $V_0$ (i.e., the bias voltage $V_B$) of the input voltage V becomes positioned at the midpoint between the voltage value where the optical output power P is at a maximum (i.e., the peak of the characteristic transmission curve) and the voltage value where the optical output power P is at a minimum (i.e., the null point of the characteristic transmission curve). As a result, the characteristic transmission curve of the LN-MZ modulator 22 becomes an odd function centered about the intermediate value $V_0$ (i.e., the bias voltage $V_B$) of the input voltage V. For this reason, changes in the average value <P> of the optical output power P due to changes in the driving amplitude VRF are counterbalanced about the intermediate value $V_0$ (i.e., the bias voltage $V_B$) of the input voltage V.

Given the above, it can be seen that the average value <P> of the optical output power P changes when the driving amplitude VRF changes. Furthermore, it can be seen that the change in the average value <P> of the optical output power P is different according to the intermediate value $V_0$ (i.e., the bias voltage $V_B$) of the input voltage V with respect to the voltage value where the optical output power P is at a minimum (i.e., the null point of the characteristic transmission curve).

In other words, the average value <P> of the optical output power P changes as the driving amplitude VRF changes, but the magnitude and the sign (i.e., the sign of the magnitude) of the change is dependent upon the intermediate value $V_0$ (i.e., the bias voltage $V_B$) of the input voltage V with respect to the voltage value where the optical output power P is at a minimum (i.e., the null point of the characteristic transmission curve).

Figure 7:
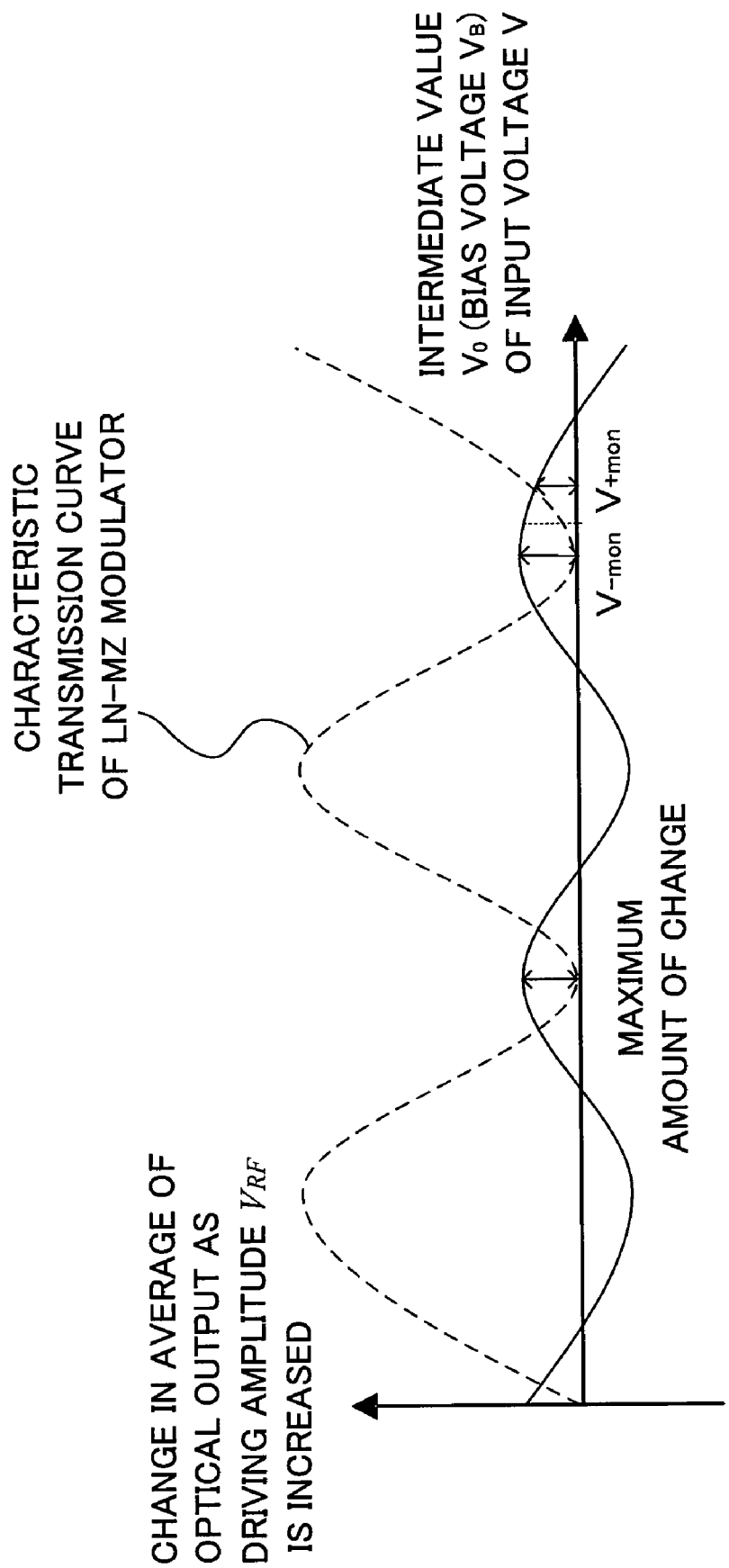
FIG. 7 is a diagram illustrating the change in the average value <P> of the optical output power P as a signed quantity resulting in a function of an intermediate value $V_0$ (i.e., the bias voltage $V_B$) of an input voltage V.

Herein, the amount of change in the average value <P> of the optical output power P is taken to be a signed quantity, and is shown as a function of the intermediate value $V_0$ (i.e., the bias voltage $V_B$) of the input voltage V in FIG. 7. The dotted line in FIG. 7 indicates the characteristic transmission curve of the optical output power P of the LN-MZ modulator 22. The solid line in FIG. 7 indicates the amount of change in the average value <P> of the optical output power P when the driving amplitude VRF is increased. From FIG. 7 it can be seen that, in the case where the driving amplitude VRF is increased when the intermediate value $V_0$ (i.e., the bias voltage $V_B$) of the input voltage V matches the voltage value where the optical output power P is at a minimum (i.e., the null point of the characteristic transmission curve), then the amount of change in the average value <P> of the optical output power P takes the maximum value while having a positive sign.

This indicates that if the bias voltage $V_B$ is controlled such that the amount of change in the average value <P> of the optical output power P is maximized when the driving amplitude VRF is increased, then the intermediate value $V_0$ (i.e., the bias voltage $V_B$) of the input voltage value V will match the voltage value where the optical output power P is at a minimum (i.e., the null point of the characteristic transmission curve).

Consequently, in the present invention, the driving amplitude VRF is first modified by the low-frequency signal (a), and then the average value <P> of the optical output power P is detected using the monitor PD 32. Subsequently, by retrieving the amplitude values of the low-frequency signal (a) in the average value <P> of the optical output power P, the amount of change in the average value <P> of the optical output power P due to the driving amplitude VRF is detected as a signed quantity.

In addition, in the present invention, a dither voltage $\pm \Delta V_B$ from a dither signal (b) is superimposed on the bias voltage $V_B$ applied to the LN-MZ modulator 22. By comparing the amount of change in the average value <P> of the optical output power P when the bias voltage $V_B = Vb + \Delta Vb$ to the amount of change in the average value <P> of the optical output power P when the bias voltage $V_B = Vb - \Delta Vb$, it is detected whether the intermediate value $V_0$ (i.e., the bias voltage $V_B$) of the input voltage V is a high voltage value or a low voltage value with respect to the voltage value where the optical output power P is at a minimum (i.e., the null point of the characteristic transmission curve).

For example, consider the case wherein the amount of change in the average value <P> of the optical output power P is V+mon in FIG. 7 when the bias voltage $V_B$ is $V_B = Vb + \Delta Vb$, and the amount of change in the average value <P> of the optical output power P is V−mon in FIG. 7 when the bias voltage $V_B$ is $V_B = Vb - \Delta Vb$. If V+mon<V−mon, then it is apparent that the intermediate value $V_0$ (i.e., the bias voltage $V_B$) of the input voltage V is at a high voltage value with respect to the voltage value where the optical output power P is at a minimum (i.e., the null point of the characteristic transmission curve).

As a result of the above, the magnitude and direction of the mismatch between the intermediate value $V_0$ of the three-level input voltage V that is input into the LN-MZ modulator 22 and the voltage value where the optical output power P of the LN-MZ modulator 22 is at a minimum (i.e., the null point of the characteristic transmission curve) can be detected. Furthermore, the bias voltage $V_B$ can be controlled such that the voltage value where the optical output power P is at a minimum (i.e., the null point of the characteristic transmission curve) and the intermediate value $V_0$ (i.e., the bias voltage $V_B$) of the input voltage V match.

Explanation of the Operational Principles Using Equations

The operational principles of the optical duobinary modulation transmitter in accordance with an embodiment of the present invention will now be described with the use of equations.

First, the optical output power P can be expressed as a periodic function of the input voltage V as shown in FIG. 3:

$$P(V) = \frac{P_{max}}{2}\left(\cos\frac{V}{V_\pi}\pi + 1\right) \quad (1)$$

Herein, Pmax is the maximum value of the optical output power P. In equation (1), the minimum value Pmin of the optical output power is taken to be 0. In addition, a single period of P(V) is taken to be $2V_\pi^-$.

Equation (1) yields the following when the input voltage V is taken to be $V_0 - VRF/2$, $V_0$, and $V_0 + VRF/2$, respectively.

$$P\left(V_0 - \frac{V_{RF}}{2}\right) = \frac{P_{max}}{2}\left(\cos\frac{V_0 - \frac{V_{RF}}{2}}{V_\pi}\pi + 1\right) \quad (2)$$

$$P(V_0) = \frac{P_{max}}{2}\left(\cos\frac{V_0}{V_\pi}\pi + 1\right) \quad (3)$$

$$P\left(V_0 + \frac{V_{RF}}{2}\right) = \frac{P_{max}}{2}\left(\cos\frac{V_0 + \frac{V_{RF}}{2}}{V_\pi}\pi + 1\right) \quad (4)$$

Next, the average value <P> of the optical output power P will be solved for, but before that, the event probability of an input signal V input into the LN-MZ modulator 22 and having values of ($V_0$−VRF/2, $V_0$, $V_0$+VRF/2) will be described.

First, the signal is assigned a logical value of 0 when the input voltage V is $V_0$, while the signal is assigned a logical value of 1 when the input voltage V is $V_0$−VRF/2 or $V_0$+VRF/2. The mark ratio of both a logical 0 and a logical 1 is assumed to be 50%.

In such a case, the event frequency is ½ for a signal wherein the input voltage V is $V_0$, the event frequency is ¼ for a signal wherein the input voltage V is $V_0$−(VRF/2), and the event frequency is ¼ for a signal wherein the input voltage V is $V_0$+(VRF/2).

Consequently, the value of the input voltage V input into the LN-MZ modulator 22 has a ½ probability of being $V_0$, a ¼ probability of being $V_0$−(VRF/2), and a ¼ probability of being $V_0$+(VRF/2).

However, since in the present invention a method is adopted wherein a three-level duobinary signal is generated from the output signal (c) of the driver 13 using the LPF 14, in practice time is required both for the signal to switch between a signal wherein the value of the input voltage V is $V_0$−(VRF/2) and a signal wherein the value of the input voltage V is $V_0$, and additionally, for the signal to switch between a signal wherein the value of the input voltage V is $V_0$ and a signal wherein the value of the input voltage V is $V_0$+(VRF/2).

Herein, the signal switching time is assumed to require a time equal to the inverse of the bit rate Rb, thus, ts=1/Rb.

In this case, when the time is t=0 and t=ts, the input voltage V exhibits the following voltage values at the following respective probabilities.
(1) A signal wherein the value of the input voltage V is $V_0$−(VRF/2) occurs at a probability of ¼;
(2) A signal wherein the value of the input voltage V is $V_0$ occurs at a probability of ½; and
(3) A signal wherein the value of the input voltage V is $V_0$+(VRF/2) occurs at a probability of ¼.

In addition, when the time t is 0<t<ts, the input voltage V exhibits the following voltage values at the following respective probabilities.
(1) A signal wherein the value of the input voltage V is $V_0$−(VRF/2) occurs at a probability of ⅛;
(2) A signal wherein the value of the input voltage V is $V_0$ occurs at a probability of ¼;
(3) A signal wherein the value of the input voltage V is $V_0$+(VRF/2) occurs at a probability of ⅛;
(4) A signal wherein the value of the input voltage V is $V_0$−(VRF/2) ((ts−t)/ts) occurs at a probability of ⅛;
(5) A signal wherein the value of the input voltage V is $V_0$−(VRF/2) (t/ts) occurs at a probability of ⅛;
(6) A signal wherein the value of the input voltage V is $V_0$+(VRF/2) (t/ts) occurs at a probability of ⅛; and
(7) A signal wherein the value of the input voltage V is $V_0$+(VRF/2) ((ts−t)/ts) occurs at a probability of ⅛.

Thus, the input voltage V takes the respective voltage values at the probabilities described above, and is input into the LN-MZ modulator 22.

Consequently, as described above, when taking into consideration the event probabilities for the respective voltages values taken as the value of the input voltage V, the average value <P> of the optical output power P can be expressed as a function of $V_0$ and VRF:

$$\langle P \rangle = \frac{P_{max}}{2} + \frac{P_{max}}{8}\cos\frac{V_0}{V_\pi}\pi\left(1 + \cos\frac{V_{RF}}{2V_\pi}\pi + \frac{2\sin\frac{V_{RF}}{2V_\pi}\pi}{\frac{V_{RF}}{2V_\pi}\pi}\right) \quad (5)$$

Herein, if b is taken to be b=$V_0$/$V_\pi^-$ (normalized by $V_\pi^-$), and m is taken to be m=VRF/$2V_\pi^-$, equation (5) becomes $$\frac{\langle P \rangle}{P_{max}/2} = 1 + \frac{1}{4}\cos b\pi\left(1 + \cos m\pi + \frac{2\sin m\pi}{m\pi}\right) \quad (6)$$

Taking the partial derivative of equation (6) with respect to m yields $$\frac{\partial}{\partial m}\frac{\langle P \rangle}{P_{max}/2} = \frac{\pi}{4}\cos b\pi\left[\frac{2\cos m\pi}{m\pi} - \left(1 + \frac{2}{m^2\pi^2}\right)\sin m\pi\right] \quad (7)$$

In optical duobinary modulation, VRF is set such that VRF is approximately equal to $2V_\pi^-$, and thus m is approximately equal to 1. Consequently, equation (7) becomes $$\frac{\partial}{\partial m}\frac{\langle P \rangle}{P_{max}/2} \cong -\frac{1}{2}\cos b\pi \quad (8)$$

The amplitude modulation of the low-frequency signal (a) onto the output signal (c) of the driver 13 is equivalent to changing the amplitude (driving amplitude) VRF of the input voltage V in FIG. 3.

Furthermore, the calculation of the amplitude values for the low-frequency signal (a) in the electrical signal corresponding to the optical output power P detected by the monitor PD 32 is equivalent to calculating the amount of change in the average value <P> of the optical output power P in accordance with the amount of change in VRF.

Furthermore, as shown by equation (8), since m is approximately equal to VRF/$2V_\pi$, calculating the amount of change in the average value <P> of the optical output power P in accordance with the amount of change in m is equivalent to calculating the amount of change in the average value <P> of the optical output power P in accordance with the amount of change in VRF. In other words, it can be seen that equation (8) is equivalent to the solid line in FIG. 7.

In equation (8), consider the case wherein b=1, i.e., wherein $V_0$=$V_\pi^-$. In this case, the optical output power P becomes 0, as per equation (1). In other words, this case is a state wherein $V_0$ is controlled to be at the null point of the characteristic transmission curve. Furthermore, according to equation (8), when $V_0$=$V_\pi^-$ the low-frequency amplitude value for the average value <P> of the optical output power P in accordance with the change in VRF reaches a maximum.

From the above, it can be seen that in case of controlling $V_0$ to be at the null point of the characteristic transmission curve, one need only control $V_0$ (i.e., the bias voltage $V_B$) such that the low-frequency amplitude value for the average value <P> of the optical output power P in accordance with the change in VRF is maximized.

Hardware

In the foregoing description, the respective constituent elements shown in FIG. 1 are assumed to be configured using dedicated hardware. However, all or part of the configuration of the bias controller subsystem 40, for example, may be realized by a computer system. For example, software may be installed on a computer system having a central processing unit (CPU), memory, interface circuits, and similar components. Via such software and hardware, concrete means for realizing the functions of the respective circuits shown in FIG. 1 are realized. Hereinafter, an example will be described wherein the low-frequency component detector 43 and the bias controller circuit 44 in the bias controller subsystem 40 shown in FIG. 1 are realized by a computer.

Figure 9:
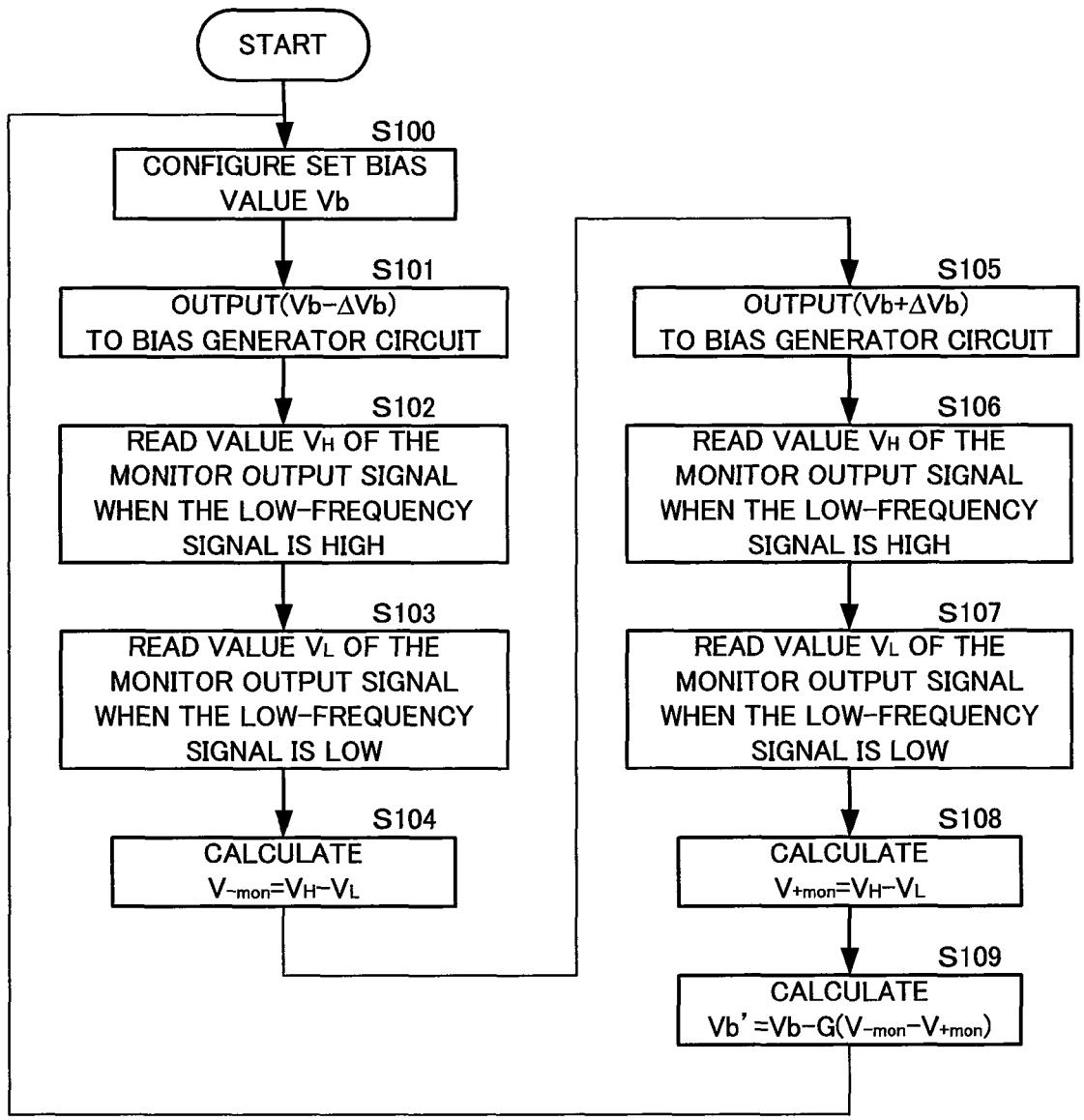
FIG. 9 is a flowchart of the operations conducted by the device shown in FIG. 1, in accordance with a first embodiment of the invention.

Referring to the flowchart shown in FIG. 9, a procedure will now be described wherein a computer functions as the low-frequency component detector 43 and the bias controller circuit 44 are operated.

First, the bias controller circuit 44 sets the set bias value Vb that constitutes the bias voltage $V_B$ applied to the LN-MZ modulator 22 (step S100). Initially, however, the initial value for the set bias value Vb is set by processing input received via an input device (not shown in the drawings). Alternatively, a value stored in advance in ROM or similar memory (not shown in the drawings) within the bias controller circuit 44 may be set as the initial value for Vb. In this case, the initial value is stored in ROM or similar memory within the bias controller circuit 44 during the product shipping stage. Subsequently, when power to the bias controller circuit 44 is switched on, the bias controller circuit 44 reads the initial value from the ROM and sets the read initial value as the set bias value Vb.

Next, the bias controller circuit 44 outputs to the bias generator circuit 45 the value (Vb−ΔVb) obtained by adding the dither bias voltage (−ΔVb) to the set bias value Vb (step S101).

Next, in the low-frequency component detector 43, the state of the low-frequency signal (a) input from the low-frequency signal generator 51 is determined to be high or low. When the low-frequency signal (a) goes high, the value VH of the monitor output signal (f) is read from the optical power detector 33 (step S102). In addition, when the low-frequency signal (a) goes low, the value VL of the monitor output signal (f) is read from the optical power detector 33 (step S103).

Next, the value of the difference V−mon=VH−VL in the monitor output signal (f) when the low-frequency signal (a) is high and low is calculated (step S104). An average value for V−mon may also be solved for by performing plural repetitions of the processing in steps S102 to S104.

Next, the bias controller circuit 44 outputs to the bias generator circuit 45 the value (Vb+ΔVb) obtained by adding the dither bias voltage (+ΔVb) to the set bias value Vb (step S105).

Next, in the low-frequency component detector 43, the state of the low-frequency signal (a) input from the low-frequency signal generator 51 is determined to be high or low. When the low-frequency signal (a) goes high, the value VH of the monitor output signal (f) is read from the optical power detector 33 (step S106). In addition, when the low-frequency signal (a) goes low, the value VL of the monitor output signal (f) is read from the optical power detector 33 (step S107).

Next, the value of the difference V+mon=VH−VL in the monitor output signal (f) when the low-frequency signal (a) is high and low is calculated (step S108). An average value for V+mon may also be solved for by performing plural repetitions of the processing in steps S106 to S108.

Subsequently, a new set bias value Vb' is calculated on the basis of the obtained V−mon and V+mon. More specifically, a correction value of set bias value Vb {G(V−mon−V+mon)} is solved for, wherein G is a control loop gain. On the basis of this result, a corrected set bias value Vb'=Vb−{G(V−mon−V+mon)} is calculated (step S109).

Next, the current set bias value Vb is replaced by the new set bias value Vb' (step S100). The above process is then subsequently repeated.

As shown in FIG. 8, by repeating such a process, the dither signal amplitude (h) progressively and asymptotically approaches 0 (as indicated by the broken line). In other words, the bias voltage $V_B$ asymptotically approaches the set bias value Vb.

Second Embodiment

Hereinafter, a second embodiment of the invention will be described.

In the optical duobinary transmitter in FIG. 1 in accordance with the first embodiment, a low-frequency signal (a) having high and low values is amplitude modulated onto the output signal (c) of the driver 13, thereby modifying the amplitude (driving amplitude) VRF of the input voltage V input into the LN-MZ modulator 22.

In the second embodiment, a low-frequency signal (a), having high, low, and middle values as shown in FIG. 10(a), is amplitude modulated onto the output signal (c) of the driver 13, thereby modifying the amplitude (driving amplitude) VRF of the input voltage V input into the LN-MZ modulator 22.

The configuration of the optical duobinary transmitter of the second embodiment is similar to that of the first embodiment, and hereinafter only the differences therebetween will be described.

First, in the second embodiment, the low-frequency signal generator 51 of the low-frequency amplitude modulator subsystem 50 outputs a low-frequency signal (a) having high, low, and middle values, as shown in FIG. 10(a).

In order to do so, the low-frequency component detector 43 first reads the value of the monitor output signal (f) output by the optical power detector 33. Upon detecting the amplitude values of the low-frequency signal (a) in the monitor output signal (f), the low-frequency component detector 43 calculates the value (VH+VL−2VM) by subtracting twice the value VM of the monitor output signal (f) when the low-frequency signal (a) is middle from the sum of the value VH of the monitor output signal (f) when the low-frequency signal (a) is high and the value VL of the monitor output signal (f) when the low-frequency signal (a) is low. Subsequently, the amplitude value (VH+VL−2VM) of the detected low-frequency signal (a) is output as a low-frequency amplitude signal (g).

Timing Chart

The operation of the components constituting the optical duobinary transmitter in accordance with the second embodiment will now be described with reference to the timing chart in FIG. 10. The reference symbols indicating the signals shown in FIG. 10 correspond to the reference symbols (a) through (h) in FIGS. 1 and 2.

The low-frequency signal (a) output from the low-frequency signal generator 51 in the second embodiment is shown in FIG. 10(a). The low-frequency signal (a) in the second embodiment is a signal having high, low, and middle values, as shown in FIG. 10(a).

In addition to the method of generating an analog voltage by using a D/A converter, a signal like that shown in FIG.

10(*a*) may also be generated by a method wherein two rectangular waves having identical frequencies but out of phase with each other are superimposed in a summing amplifier.

Figure 10:
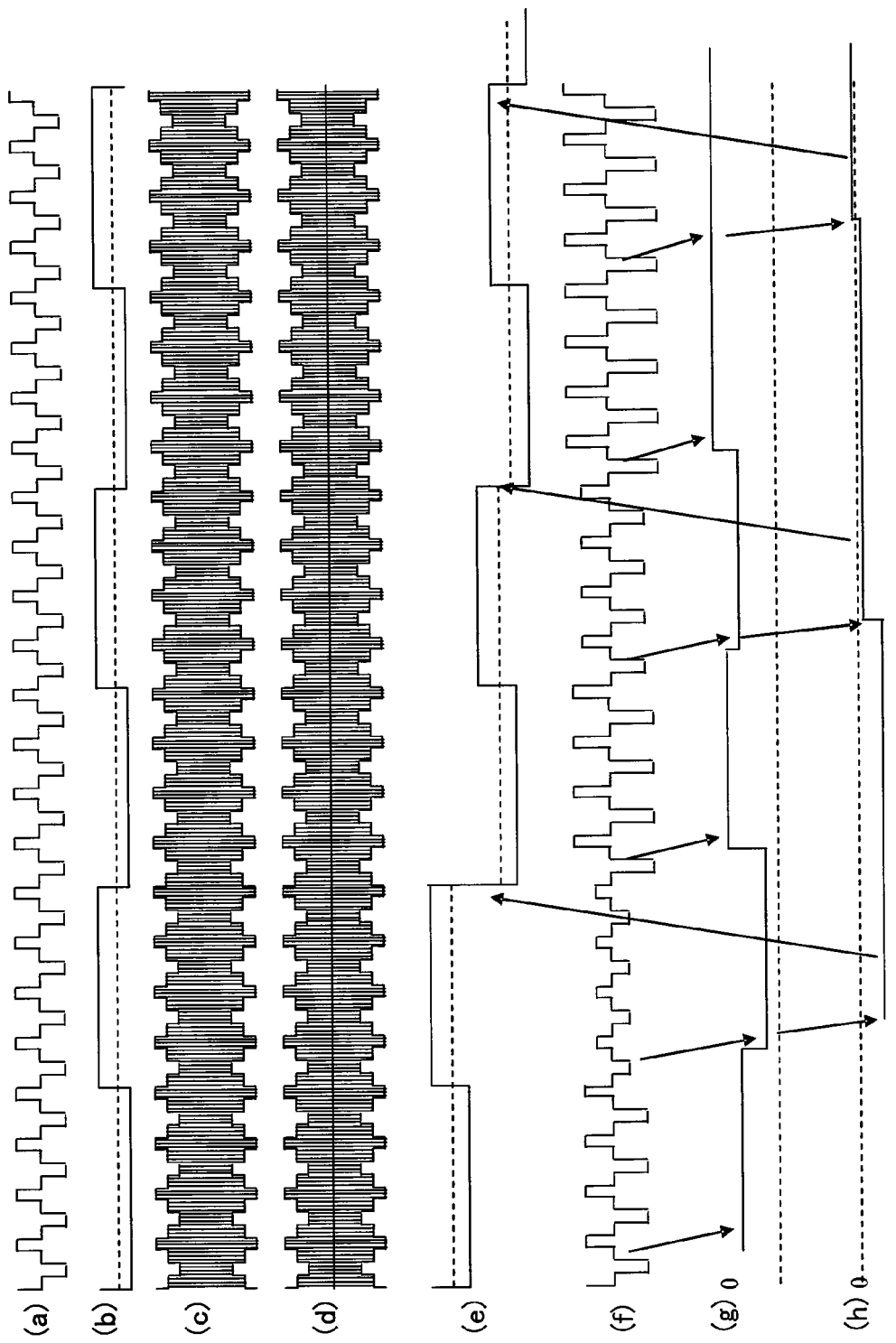
FIG. 10 is a diagram illustrating the waveforms of the signals output by the respective components of the device shown in FIG. 1, in accordance with a second embodiment of the invention.

Furthermore, the low-frequency signal (a) in the second embodiment need not be a stepped signal as shown in FIG. 10(*a*), but may any signal having high, low, and middle values. For example, a wave may be used that gradually transitions between high, middle, and low values.

The low-frequency signal generator 51 outputs the low-frequency signal (a) to the driving amplitude adjustment circuit 52. Subsequently, the driving amplitude adjustment circuit 52 receives the low-frequency signal (a), generates a pilot tone, and supplies this tone to the gain control terminal of the driver 13. In so doing, the low-frequency signal (a) is amplitude modulated onto the output signal (c) of the driver 13.

The output signal (c) of the driver 13 is shown in FIG. 10(*c*). The output signal (c) of the driver 13 is then input into a low-pass filter 14. At the low-pass filter (LPF) 14, the output signal (c) of the driver 13 is converted into a three-level duobinary signal (d). The three-level duobinary signal (d) converted at the low-pass filter (LPF) 14 is then input into the LN-MZ modulator 22. The three-level duobinary signal (d) converted at the low-pass filter (LPF) 14 is shown in FIG. 10(*d*).

In the second embodiment, if VRF is taken to be the amplitude (driving amplitude) of the three-level duobinary signal (d), then the driving amplitude VRF is modulated to be VRF=VRF+ΔVRF when the low-frequency signal (a) is high, and the driving amplitude VRF is modulated to be VRF=VRF−ΔVRF when the low-frequency signal (a) is low. When the low-frequency signal (a) is middle, the driving amplitude VRF is VRF=VRF.

Meanwhile, the dither generator 441 within the bias controller circuit 44 generates a dither signal (b), and outputs the generated dither signal (b) to the dither component detector 442 and the adder 444. The dither signal (b) generated by the dither generator 441 is shown in FIG. 10(*b*).

The dotted line in FIG. 10(*b*) indicates the value of the set bias value Vb, while the solid line indicates the dither signal (b) output by the dither generator 441. The dither bias voltage values have ±ΔVb with respect to the set bias value Vb.

Upon receiving as input both the new set bias value Vb calculated by the bias value calculator 443 as well as the dither signal (b) generated by the dither generator 441, the adder 444 generates a signal (e) that takes the combined voltage (Vb+ΔVb) of the new set bias value Vb and the dither bias voltage value ±ΔVb to be the bias voltage $V_B$, and then outputs this signal (e) to the bias generator circuit 45. The signal (e) that takes (Vb±ΔVb) to be the bias voltage $V_B$ and output from the adder 444 is shown in FIG. 10(*e*). The broken line in FIG. 10(*e*) indicates the set bias value Vb, while the solid line indicates the signal waveform of the bias voltage $V_B$(=Vb±ΔVb) upon which the dither bias voltage values ±ΔVb of the dither signal (b) have been superimposed.

Upon receiving as input the signal (e) that takes (Vb±ΔVb) to be the bias voltage $V_B$ from the adder 444, the bias generator circuit 45 generates a bias voltage $V_B$=(Vb±ΔVb), and then applies this voltage $V_B$ to the LN-MZ modulator 22 via the bias tee 15.

Subsequently, the bias voltage $V_B$=(Vb±ΔVb) is applied to the LN-MZ modulator 22. In addition, upon receiving as input the three-level duobinary signal (d) (FIG. 10(*d*)), the LN-MZ modulator 22 modulates the light from the CW laser diode 21, and generates an optical duobinary signal.

The optical duobinary signal generated by the LN-MZ modulator 22 is then input into the monitor PD 32 via the optical coupler 31. The monitor PD 32 detects the optical output power of the optical duobinary signal, converts the detected optical output power into a corresponding electrical signal, and then outputs this electrical signal to the optical power detector 33.

The optical power detector 33 converts the electrical signal input from the monitor PD 32 from analog to digital, and then outputs the digital signal as the monitor output signal (f). The monitor output signal (f) output by the optical power detector 33 is shown in FIG. 10(*f*).

The pulse height corresponding to the low-frequency signal (a) in the monitor output signal (f) shown in FIG. 10(*f*) is changed by the period of the dither signal (b). This change occurs because the bias voltage $V_B$(=Vb±ΔVb), upon which the dither bias voltage value ±ΔVb of the dither signal (b) has been superimposed, is applied to the LN-MZ modulator 22, and thus the optical duobinary signal generated by the LN-MZ modulator 22 is changed.

Next, the low-frequency component detector 43 detects the amplitude values of the next low-frequency signal (a) in the monitor output signal (f) output by the optical power detector 33 (FIG. 10(*f*)). The low-frequency component detector 43 then outputs the amplitude values of the detected low-frequency signal (a) as a low-frequency amplitude signal (g), and outputs this low-frequency amplitude signal (g) to the dither component detector 442 within the bias controller circuit 44.

First, the low-frequency component detector 43 solves for the amplitude values V−mon' of the low-frequency signal (a) that is present when a bias voltage $V_B$(=Vb−ΔVb) is applied to the LN-MZ modulator 22 by the bias generator circuit 45.

More specifically, the low-frequency component detector 43 calculates the value (VH+VL−2VM) for the case wherein a bias voltage V (=Vb−ΔVb) is applied to the LN-MZ modulator 22. The value (VH+VL−2VM) is obtained by subtracting twice the value VM of the monitor output signal (f) when the low-frequency signal (a) is middle from the sum of the value VH of the monitor output signal (f) when the low-frequency signal (a) is high and the value VL of the monitor output signal (f) when the low-frequency signal (a) is low.

In addition, the low-frequency component detector 43 also solves for the amplitude value V+mon' of the low-frequency signal (a) that is present when a bias voltage $V_B$(=Vb+ΔVb) is applied to the LN-MZ modulator 22 by the bias generator circuit 45.

More specifically, the low-frequency component detector 43 calculates the value (VH+VL−2VM) for the case wherein a bias voltage V (=Vb+−ΔVb) is applied to the LN-MZ modulator 22. The value (VH+VL−2VM) is obtained by subtracting twice the value VM of the monitor output signal (f) when the low-frequency signal (a) is middle from the sum of the value VH of the monitor output signal (f) when the low-frequency signal (a) is high and the value VL of the monitor output signal (f) when the low-frequency signal (a) is low. The low-frequency amplitude signal (g) output by the low-frequency component detector 43 is shown in FIG. 10(*g*).

The dither component detector 442 then refers to the dither signal (b) input from the dither generator 441, and solves for the amplitude values of the dither signal (b) in the low-frequency amplitude signal (g).

More specifically, the dither component detector 442 calculates the difference {(V−mon')−(V+mon')} between the value V−mon' of the low-frequency amplitude signal (g) when a bias voltage $V_B$(=Vb−ΔVb) is applied to the LN-MZ modulator 22 by the bias generator circuit 45, and the value V+mon' of the low-frequency amplitude signal (g) when a bias voltage $V_B$(=Vb+ΔVb) is applied to the LN-MZ modulator 22 by the bias generator circuit 45.

Subsequently, the dither component detector 442 outputs the calculated amplitude values of the dither signal (b) as a dither signal amplitude (h), and outputs this signal to the bias value calculator 443 within the bias controller circuit 44. The dither signal amplitude (h) output by the dither component detector 442 is shown in FIG. 10(h).

Upon receiving as input the dither signal amplitute (h) from the dither component detector 442, the bias value calculator 443 multiplies the amplitude values {(V−mon')−(V+mon')} of the dither signal (b) by a coefficient G that determines a control loop, and takes this quantity as a correction value for the set bias value Vb. The bias value calculator 443 then takes the corrected set bias value Vb'(=[Vb−G{(V−mon')−(V+mon')}]) as the new set bias value Vb, and outputs this new set bias value Vb to the adder 444 within the bias controller circuit 44.

Description of the Operational Principles of the Second Embodiment Using Equations In the second embodiment, the low-frequency component detector 43 evaluates VH+VL−2VM to solve for the amplitude values of the low-frequency signal (a). In other words, the low-frequency component detector 43 solves for the value obtained by subtracting twice the value VM of the monitor output signal (f) when the low-frequency signal (a) is middle from the sum of the value VH of the monitor output signal (f) when the low-frequency signal (a) is high and the value VL of the monitor output signal (f) when the low-frequency signal (a) is low. Hereinafter, the value of VH+VL−2VM will be described with the use of equations.

First, if the average value <P> of the optical output power P is expressed as a function of VRF, then evaluating VH+VL−2VM is equivalent to $$\langle P \rangle (V_{RF}+\Delta V_{RF}) + \langle P \rangle (V_{RF}-\Delta V_{RF}) - 2\langle P \rangle (V_{RF}) \quad (9)$$

By expanding the above using the relationship $$\langle P \rangle (V_{RF} + \Delta V_{RF}) = \quad (10)$$
$$\langle P \rangle (V_{RF}) + \frac{\partial \langle P \rangle (V_{RF})}{\partial V_{RF}} \Delta V_{RF} + \frac{1}{2} \frac{\partial^2 \langle P \rangle (V_{RF})}{\partial V_{RF}^2} \Delta V_{RF}^2$$

equation (9) becomes equal to $$\frac{\partial^2 \langle P \rangle (V_{RF})}{\partial V_{RF}^2} \Delta V_{RF}^2 \quad (11)$$

It can be seen from equation (11) that evaluating VH+VL−2VM is equivalent to solving for the amount of second-order change in the monitor output signal (f) (i.e., the average value <P> of the optical output power P) due to VRF.

The amount of second-order change in the average value <P> of the optical output power P due to VRF will now be considered.

It was shown in equation (6) that the relationship $$\frac{\langle P \rangle}{P_{max}/2} = 1 + \frac{1}{4}\cos b\pi \left(1 + \cos m\pi + \frac{2\sin m\pi}{m\pi}\right) \quad (12)$$

holds true, wherein m=VRF/Vπ⁻ and b=V₀/Vπ⁻. Taking the second-order partial derivative of equation (12) with respect to m yields $$\frac{\partial^2}{\partial m^2}\left[\frac{\langle P \rangle}{P_{max}/2}\right] = \quad (13)$$
$$-\frac{\pi^2}{4}\cos b\pi \left[\left(1 + \frac{4}{m^2\pi^2}\right)\cos m\pi - \left(\frac{2}{m\pi} - \frac{4}{m^3\pi^3}\right)\sin m\pi\right]$$

Since in optical duobinary modulation VRF is typically set such that VRF is approximately equal to 2Vπ⁻. Since m is thus approximately equal to 1, equation (13) becomes $$\frac{\partial^2}{\partial m^2}\left[\frac{\langle P \rangle}{P_{max}/2}\right] \cong \left(1 + \frac{\pi^2}{4}\right)\cos b\pi \quad (14)$$

It can thus be seen from equation (14) that the amount of second-order change in the average value <P> of the optical output power P due to m (i.e., the amount of second-order change in average value <P> of the optical output power P due to VRF) is proportional to cos (bπ⁻).

Consider equation (14) in the case where b=1 (i.e., V₀=Vπ⁻). In this case, the optical output power P becomes 0, as per equation (1). In other words, this case is a state wherein V₀ is controlled to be at the null point of the characteristic transmission curve. Furthermore, according to equation (14), when V₀=Vπ⁻ the amount of second-order change in the average value <P> of the optical output power P due to VRF reaches a minimum.

From the above, it can be seen that in the case of controlling V₀ to be at the null point of the characteristic transmission curve, one need only control the bias voltage V_B such that (VH+VL−2VM) is minimized, this equation corresponding to the amount of second order change in the average value <P> of the optical output power P due to VRF.

Hardware

Similarly to the first embodiment, in the second embodiment the respective constituent elements shown in FIG. 1 are assumed to be configured using dedicated hardware. However, all or part of the configuration of the bias controller subsystem 40, for example, may be realized by a computer system. For example, software may be installed on a computer system having a central processing unit (CPU), memory, interface circuits, and similar components. Via such software and hardware, concrete means for realizing the functions of the respective circuits shown in FIG. 1 are realized. Hereinafter, an example will be described wherein the low-frequency component detector 43 and the bias controller circuit 44 in the bias controller subsystem 40 shown in FIG. 1 are realized by a computer.

Figure 11:
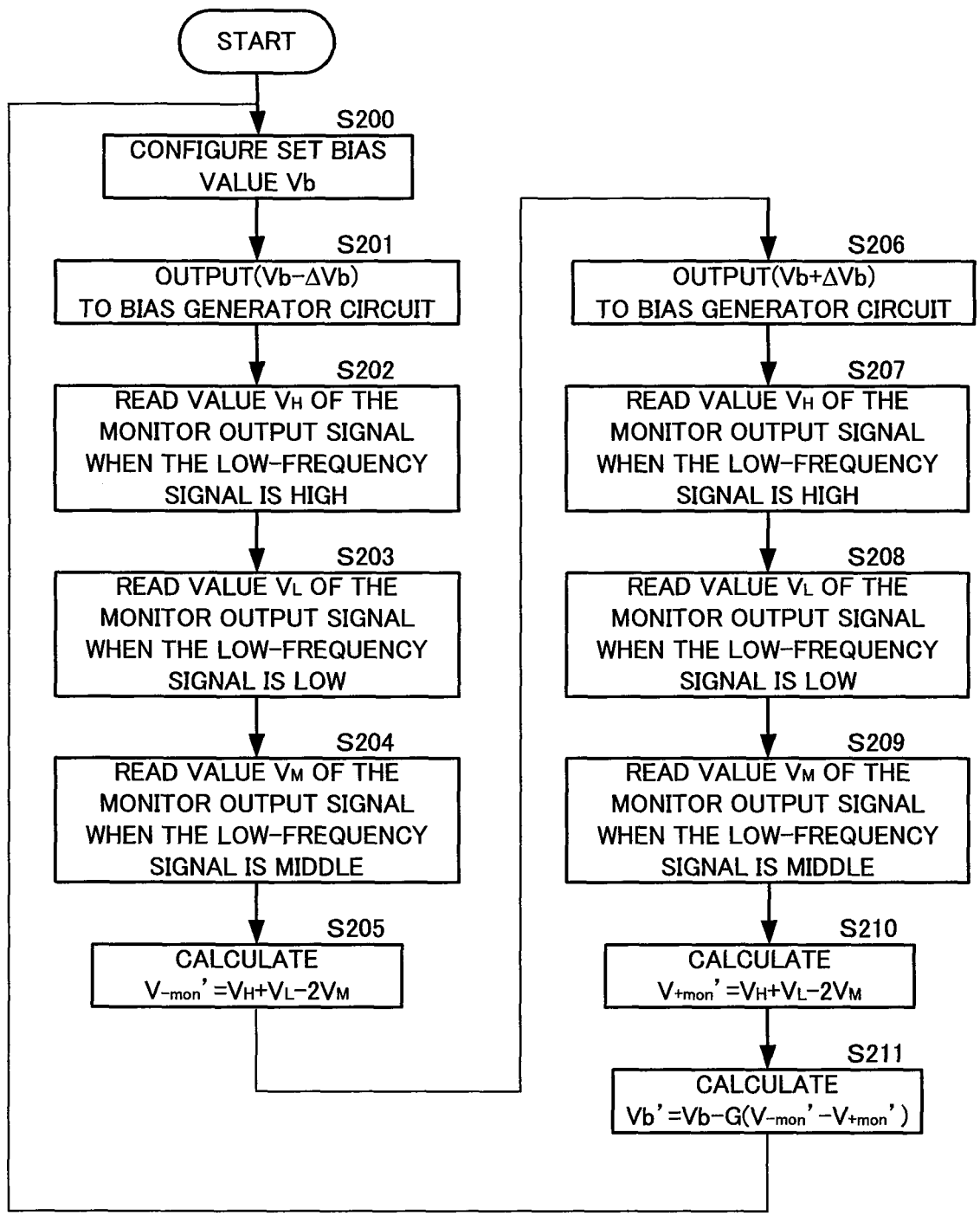
FIG. 11 is a flowchart of the operations conducted by the device shown in FIG. 1, in accordance with a second embodiment of the invention.

Referring to the flowchart shown in FIG. 11, a procedure will now be described wherein a computer functions as the low-frequency component detector 43 and the bias controller circuit 44.

First, the bias controller circuit 44 sets the set bias value Vb that constitutes the bias voltage V_B applied to the LN-MZ modulator 22 (step S200). Initially, however, the initial value for the set bias value Vb is input by processing receipt via an input device (not shown in the drawings). Alternatively, a value stored in advance in ROM or similar memory (not shown in the drawings) within the bias controller circuit 44 may be set as the initial value for Vb. In this case, the initial value is stored in ROM or similar memory within the bias controller circuit 44 during the product shipping stage. Subsequently, when power to the bias controller circuit 44 is switched on, the bias controller circuit 44 reads the initial value from the ROM and sets the read-out initial value as the set bias value Vb.

Next, the bias controller circuit 44 outputs to the bias generator circuit 45 the value (Vb−ΔVb) obtained by adding the dither bias voltage (−ΔVb) to the set bias value Vb (step S201).

Next, in the low-frequency component detector 43, the state of the low-frequency signal (a) input from the low-frequency signal generator 51 is determined to be high, low, or middle. When the low-frequency signal (a) goes high, the value VH of the monitor output signal (f) is read from the optical power detector 33 (step S202). In addition, when the low-frequency signal (a) goes low, the value VL of the monitor output signal (f) is read from the optical power detector 33 (step S203). In addition, when the low-frequency signal (a) goes middle, the value VM of the monitor output signal (f) is read from the optical power detector circuit 33 (step S204).

Next, the value of the difference V−mon'=VH+VL−2VM in the monitor output signal (f) is calculated (step S205). An average value for V−mon' may also be solved for by performing plural repetitions of the processing in steps S202 to S205.

Next, the bias controller circuit 44 outputs to the bias generator circuit 45 the value (Vb+ΔVb) obtained by adding the dither bias voltage (+ΔVb) to the set bias value Vb (step S206).

Next, in the low-frequency component detector 43, the state of the low-frequency signal (a) input from the low-frequency signal generator 51 is determined to be high, low, or middle. When the low-frequency signal (a) goes high, the value VH of the monitor output signal (f) is read from the optical power detector 33 (step S207). In addition, when the low-frequency signal (a) goes low, the value VL of the monitor output signal (f) is read from the optical power detector 33 (step S208). In addition, when the low-frequency signal (a) goes middle, the value VM of the monitor output signal (f is read from the optical power detector circuit 33 (step S209).

Next, the value of the difference V+mon'=VH+VL−2VM in the monitor output signal (f) is calculated (step S210). An average value for V+mon' may also be solved for by performing plural repetitions of the processing in steps S207 to S210.

Subsequently, a new set bias value Vb' is calculated on the basis of the obtained V−mon' and V+mon'. More specifically, a correction amount {G(V−mon'−V+mon')} is solved for, wherein G is a control loop gain. On the basis of this result, a corrected set bias value Vb'=Vb−{G(V−mon'−V+mon')} is calculated (step S211).

Next, the current set bias value Vb is replaced by the new set bias value Vb' (step S200). The above process is then subsequently repeated.

As shown in FIG. 10, by repeating such a process, the dither signal amplitude (h) progressively and asymptotically approaches 0 (as indicated by the broken line). In other words, the bias voltage $V_B$ asymptotically approaches the set bias value Vb.

It should be appreciated that, in step S204 and step S209, the value of the difference V+mon' and V−mon' in the monitor output signal (f) may be evaluated by reading the value VM twice from the optical power detector circuit 33 when the low-frequency signal (a) goes middle, and then evaluating VH+VL−VM−VM'. Herein, the value of the first reading of the monitor output signal (f) is taken to be VM, while the value of the second reading of the monitor output signal (f) is taken to be VM'.

Third Embodiment

A third embodiment of the present invention will now be described. In the foregoing first and second embodiments, technology was described wherein the intermediate value $V_0$ (i.e., the bias voltage $V_B$) of the input voltage V input into the LN-MZ modulator 22 is controlled so as to match the bias voltage $V_B$ where the optical output power P of the LN-MZ modulator 22 is at a minimum (i.e., the null point of the characteristic transmission curve), as shown in FIG. 4.

In the third embodiment, the control loop of the bias voltage $V_B$ is reversed, while maintaining the same configuration of the optical duobinary transmitters in accordance with the first and the second embodiments. In this case, the intermediate value $V_0$ (i.e., the bias voltage $V_B$) of the input voltage V input into the LN-MZ modulator 22 is controlled so as to match the voltage value where the optical output power P of the LN-MZ modulator 22 is at a maximum (i.e., the peak of the characteristic transmission curve), as shown in FIG. 5.

In the first and second embodiments, an input voltage V is input into the LN-MZ modulator 22, being centered about the voltage value where the optical output power P of the LN-MZ modulator 22 is at a minimum (i.e., the null point of the characteristic transmission curve), as shown in FIG. 4. For this reason, when the phase of the characteristic transmission curve of the LN-MZ modulator 22 is 0° or 180°, a very strong signal is obtained.

Meanwhile, in the third embodiment, an input voltage V is input into the LN-MZ modulator 22 that is centered about the voltage value where the optical output power P of the LN-MZ modulator 22 is at a maximum (i.e., the peak of the characteristic transmission curve), as shown in FIG. 5. In so doing, a strong signal is obtained only when the phase of the characteristic transmission curve of the LN-MZ modulator 22 is 90°. In other words, in the third embodiment, the optical signal generated by the LN-MZ modulator 22 is a binary signal similar to the binary IM optical transmitters of the related art.

From the above it can be seen that, in addition to an optical duobinary signal (i.e., a three-level signal), a signal similar to a binary IM signal (i.e., a binary signal) can also be transmitted by reversing the control loop of the bias voltage $V_B$ in the first and second embodiments of the present invention.

Moreover, when comparing the case in FIG. 5, wherein an input voltage V is input into the LN-MZ modulator 22 centered about the voltage value where the optical output power P of the LN-MZ modulator 22 is at a maximum (i.e., the peak of the characteristic transmission curve), to the case of FIG. 4, wherein an input voltage V is input into the LN-MZ modulator 22 centered about the voltage value where the optical output power P of the LN-MZ modulator 22 is at a minimum (i.e., the null point of the characteristic transmission curve), the logical values of the optical duobinary signal output from the LN-MZ modulator 22 are reversed.

However, by reversing the output values of the multiplexer 11, the logical values of the optical duobinary signal output from the LN-MZ modulator 22 in the case of FIG. 5 can be made identical to the logical values of the optical duobinary signal output from the LN-MZ modulator 22 in the case of FIG. 4. Furthermore, typical, commercially-available multiplexers 11 have functions to reverse output logical values.

As described in the foregoing, the present invention enables automatic bias control of an optical duobinary transmitter using a single-drive LN-MZ modulator. In so doing, null point drift in the LN-MZ modulator is compensated for, and an optical duobinary transmitter is realized that operates stably over long periods of time.

What is claimed is:

1. An optical transmitter having a single-drive LN-MZ modulator, comprising:
   means for converting a data signal into a three-level, duobinary signal;
   means for generating a three-level, optical duobinary signal by modulating an optical signal using the duobinary signal;
   means for amplitude modulating by a low-frequency signal onto the duobinary signal input into the means for generating the optical duobinary signal;
   means for outputting a monitor output signal by monitoring the output from the means for generating the optical duobinary signal; and
   means for generating and controlling a bias voltage applied to the means for generating the optical duobinary signal;
      wherein the means for generating and controlling a bias voltage generates two bias voltages (Vb+ΔVb) and (Vb−ΔVb) by adding a drift bias ±ΔVb to a set bias value Vb, and applies the two bias voltages in alternation to the means for generating the optical duobinary signal;
      wherein the two bias voltages are respectively generated by first solving for the differences V−mon and V+mon between the monitor output signal value when the low-frequency signal is high and the monitor output signal value when the low-frequency signal is low; and
      wherein, upon solving for the difference between V−mon and V+mon, a new set bias value Vb is configured and the two bias voltages (Vb+ΔVb) and (Vb−ΔVb) are generated based on the difference between V−mon and V+mon.

2. An optical transmitter having a single-drive LN-MZ modulator, comprising:
   means for converting a three-level, duobinary signal from a data signal;
   means for generating a three-level, optical duobinary signal by modulating an optical signal using the duobinary signal;
   means for amplitude modulating by a low-frequency signal onto the duobinary signal input into the means for generating the optical duobinary signal;
   means for outputting a monitor output signal by monitoring the output from the means for generating the optical duobinary signal; and
   means for generating and controlling a bias voltage applied to the means for generating the optical duobinary signal;
      wherein the means for generating and controlling a bias voltage generates two bias voltages (Vb+ΔVb) and (Vb−ΔVb) by adding a drift bias ±ΔVb to a set bias value Vb, and applies the two bias voltages in alternation to the means for generating the optical duobinary signal;
      wherein the two bias voltages are respectively generated by first solving for the quantities V−mon' and V+mon', being obtained by subtracting twice the value of the monitor output signal when the low-frequency signal is middle from the sum of the value of the monitor output signal when the low-frequency signal is high and the value of the monitor output signal when the low-frequency signal is low; and
      wherein, upon solving for the difference between V−mon' and V+mon', a new set bias value Vb is configured, and the two bias voltages (Vb+ΔVb) and (Vb−ΔVb) are generated based on the difference between V−mon' and V+mon'.

3. The optical transmitter according to claim 1, wherein the drift bias ±ΔVb is a dither bias voltage.

4. The optical transmitter according to claim 2, wherein the drift bias ±ΔVb is a dither bias voltage.

5. An optical transmitter having a single-drive LN-MZ modulator, comprising:
   means for generating a three-level, duobinary signal from data;
   means for generating a three-level, optical duobinary signal by modulating an optical signal using the duobinary signal;
   means for amplitude modulating by a low-frequency signal onto an electrical signal from the single-drive LN-MZ modulator;
   means for outputting a monitor output signal by monitoring the output from the means for generating the optical duobinary signal; and
   means for generating and controlling a bias voltage applied to the means for generating the optical duobinary signal;
      wherein the means for generating and controlling the bias voltage generates two bias voltages (Vb+ΔVb) and (Vb−ΔVb) by adding a drift bias ±ΔVb to a set bias value Vb, and applies the two bias voltages in alternation to the means for generating the optical duobinary signal;
      wherein the two bias voltages are respectively generated by first solving for the differences V−mon and V+mon between the monitor output signal value when the low-frequency signal is high and the monitor output signal value when the low-frequency signal is low; and
      wherein the difference between V−mon and V+mon is solved for, and based upon the differences corresponding to the two bias voltages (Vb+ΔVb) and (Vb−ΔVb), a new set bias value Vb is configured, and the two bias voltages (Vb+ΔVb) and (Vb−ΔVb) are generated.

* * * * *